US006753872B2

(12) United States Patent
Moriwaki et al.

(10) Patent No.: US 6,753,872 B2
(45) Date of Patent: Jun. 22, 2004

(54) RENDERING PROCESSING APPARATUS REQUIRING LESS STORAGE CAPACITY FOR MEMORY AND METHOD THEREFOR

(75) Inventors: Shohei Moriwaki, Hyogo (JP); Yoshifumi Azekawa, Hyogo (JP); Osamu Chiba, Hyogo (JP); Kazuhiro Shimakawa, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 496 days.

(21) Appl. No.: 09/756,268

(22) Filed: Jan. 9, 2001

(65) Prior Publication Data

US 2001/0008400 A1 Jul. 19, 2001

(30) Foreign Application Priority Data

Jan. 14, 2000 (JP) ....................................... 2000-005417

(51) Int. Cl.[7] ................................................ G06F 13/00
(52) U.S. Cl. ........................ 345/537; 345/503; 345/531
(58) Field of Search ................................ 345/503, 520, 345/531, 536, 537; 710/307, 316

(56) References Cited

U.S. PATENT DOCUMENTS 5,560,030 A 9/1996 Guttag et al.
5,727,139 A * 3/1998 Owen et al. ................ 345/671
5,767,865 A * 6/1998 Inoue et al. ................ 345/519
5,909,219 A 6/1999 Dye
5,940,067 A * 8/1999 Greene ........................ 345/536
5,949,428 A 9/1999 Toelle et al.
5,956,046 A * 9/1999 Kehlet et al. ............... 345/502
6,014,125 A * 1/2000 Herbert ....................... 345/660
6,262,748 B1 * 7/2001 Deering et al. ............. 345/519
6,278,645 B1 * 8/2001 Buckelew et al. ..... 365/230.01
6,466,220 B1 * 10/2002 Cesana et al. .............. 345/537
6,535,218 B1 * 3/2003 Schlapp ...................... 345/545

FOREIGN PATENT DOCUMENTS

JP 6-19675 1/1994
JP 10-269378 10/1998

OTHER PUBLICATIONS

Bechtolsheim, A. and Baskett, F. High–Performance Raster Graphics for Microcomputer Systems. Proceedings Of The 7th Annual Conference On Computer Graphics And Interactive Techniques. Jul. 1980, 43–47.*

* cited by examiner

*Primary Examiner*—Ulka J. Chauhan
(74) *Attorney, Agent, or Firm*—McDermott, Will & Emery

(57) ABSTRACT

In a rendering processing system having a rendering memory for storing rendering pixel data generated by a rendering operation circuit and a display memory for storing the image data of a current frame read out from the rendering memory, the display memory stores only the pixel data read out from the rendering memory with prescribed information excluded therefrom. Thus, it is possible to decrease the storage capacity of the display memory and also reduce the time required for writing data into the display memory.

7 Claims, 14 Drawing Sheets

RENDERING PROCESSING APPARATUS REQUIRING LESS STORAGE CAPACITY FOR MEMORY AND METHOD THEREFOR

BACKGROUND OF THE INVENTION

1. Field of the Invention

The present invention relates to rendering processing apparatuses and methods for rendering data used to display images, and more particularly, to a rendering processing apparatus and method efficiently performing buffer control of image data for displaying an image on a display unit based on the image data.

2. Description of the Background Art

In a rendering processing system of three-dimensional graphics, for example, a series of rendering processes are performed as follows: image data are generated for display of an image; the generated image data are stored in a memory, such as a frame buffer; and the image is displayed on a display unit, such as a cathode ray tube (CRT), based on the image data stored in the memory such as the frame buffer. In particular, to smoothly display images, various approaches have been taken to improve buffering control for temporarily storing image data in a frame buffer or the like, in order to efficiently transfer the image data to a display unit according to a video refresh period. One of such buffering control is a double buffering control as disclosed, for example, in Japanese Patent Laying-Open No. 6-19675.

A rendering processing system performing such double buffer control includes: a rendering engine for generating image data; and two frame memories called an A plane and a B plane each storing one-frame-basis image data. While the one-frame-basis image data stored in the A plane are being output to a display unit, the rendering engine writes image data for a next frame into the B plane. When the output of the one-frame image data stored in the A plane is completed, the image data for the next frame stored in the B plane are output to the display unit. During the transfer of the image data from the B plane to the display unit, the rendering engine writes image data for a next frame into the A plane. Thus, the two frame memories, A plane and B plane, are controlled to function alternately as a rendering plane for having the rendering data written thereinto and a displaying plane for outputting the image data to the display unit.

In the three-dimensional graphics processing, the rendering data stored in each of the two memories is comprised of a plurality of pixel data corresponding to a plurality of pixels included in one frame. Each of the pixel data includes three-color information R, G, B representing red, green and blue of the pixel, respectively, and $\alpha$ value information representing transparency of the pixel.

Normally, the rendering engine and the two frame memories are formed of separate semiconductor chips. Some approaches have been taken to increase the rendering speed, which approaches include: to widen a bus width connecting the rendering engine and each frame memory; and to utilize a high-speed memory as the frame memory. However, the widening of the bus width is restricted due to the limited number of input/output pin terminals of the memory and to the increase of the charge/discharge current. The speeding-up of the memory is also limited.

Based on the above, it has been considered to incorporate a frame memory in a rendering engine formed of one chip. However, arranging two frame memories each storing a large amount of data on the same semiconductor chip increases both the chip area and the cost.

SUMMARY OF THE INVENTION

An object of the present invention is to provide a rendering processing apparatus having a buffering frame memory reduced in storage capacity.

Another object of the present invention is to provide a rendering processing apparatus performing buffering control that can reduce storage capacity required for a memory.

Further object of the present invention is to provide a method of controlling a buffering on pixel data to reduce a required memory storage capacity in rendering processing.

The rendering processing apparatus according to the present invention includes: a rendering operation circuit for performing an operation for generating a plurality of pixel data corresponding to a plurality of pixels constituting one display screen; a first memory for storing the plurality of pixel data generated by the rendering operation circuit; and a transfer circuit for transferring pixel data corresponding to each of the pixel data with prescribed information removed therefrom to a second memory for storage. The second memory outputs the stored data for display by a display unit on a display screen thereof.

The rendering processing apparatus according to another aspect of the present invention includes: rendering operation circuitry performing an operation for generating a plurality of pixel data corresponding to a plurality of pixels constituting a screen; and a first memory for storing the plurality of plurality of received from the rendering circuitry; and a transfer circuit connected to the first memory for obtaining transfer data from the plurality of pixel data excluding prescribed data for transference to a second memory.

The pixel data includes three-color information of red, green and blue, and alpha value information representing transparency of a corresponding pixel. The prescribed data includes at least the alpha value information of each of the pixel data.

The rendering image method according to further aspect of the present invention includes the steps of: generating a plurality of first pixel data corresponding to a plurality of pixels constituting a screen; storing the plurality of first pixel data in a first memory; transfer first transfer data to a second memory through a data bus; storing the first transfer data in the second memory; and transfer the first transfer data from the second memory to a display unit for displaying an image.

First pixel data each include three-color information of red, green and blue, and alpha value information representing transparency of a corresponding pixel. First transfer data is obtained from the plurality of excluding at least the alpha value information of each first pixel data.

Each of the plurality of pixel data stored in the first memory includes three-color information representing red, green and blue of the pixel, and a value information representing transparency of the pixel. The prescribed information removed in the transfer circuit includes the $\alpha$ value information.

The second memory is not required to store the $\alpha$ value information at least, and therefore, it is possible to reduce the data amount to be stored in the second memory. In addition, the data amount to be transferred to the second memory is small, which leads to the reduction in the time required for the data transfer, and thus, high-speed data transfer can be implemented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
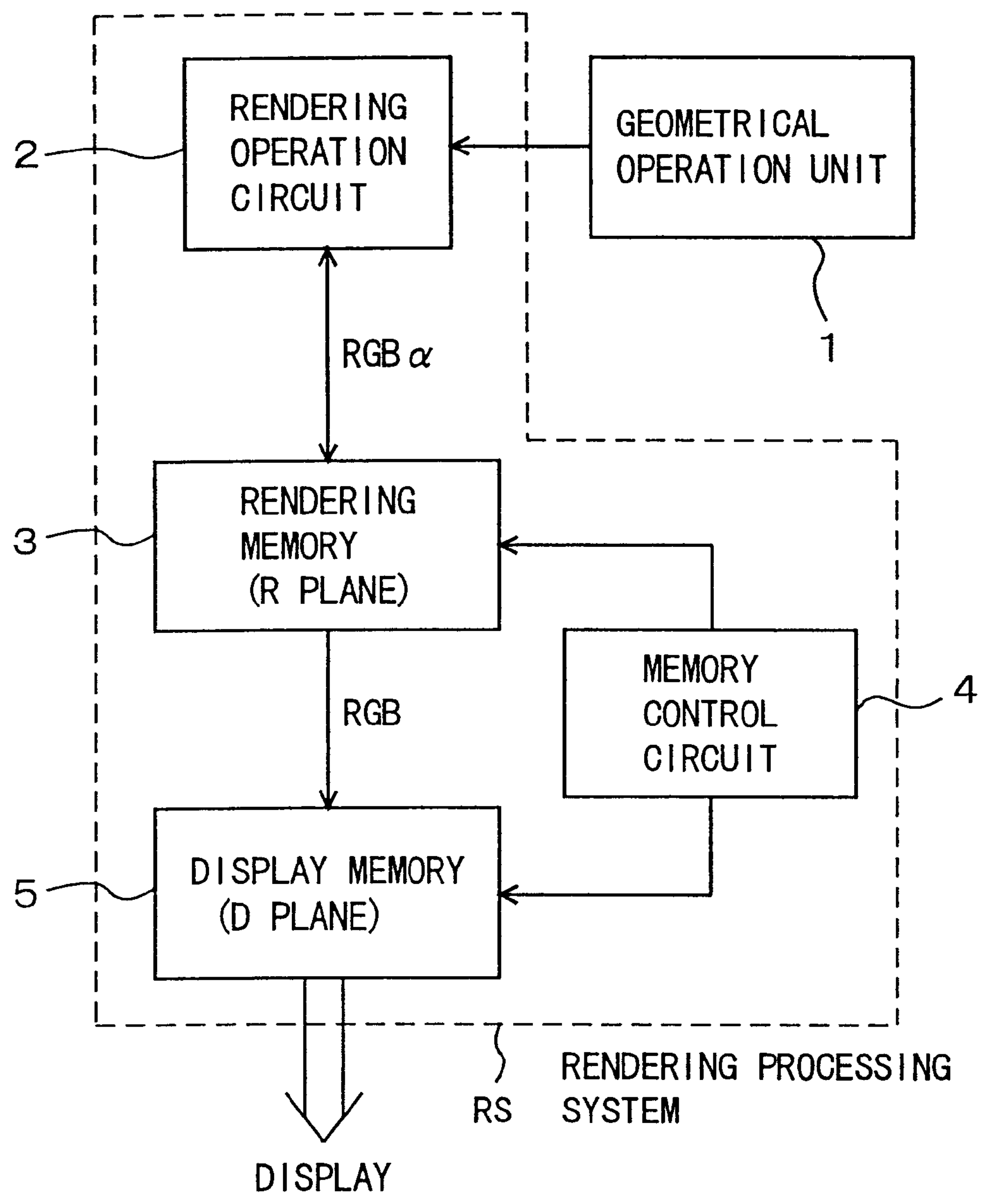
FIG. 1 is a diagram schematically showing an entire configuration of a rendering processing system according to a first embodiment of the present invention.

FIG. 1 schematically shows a configuration of a rendering processing system according to the first embodiment of the present invention. Referring to FIG. 1, a rendering processing system RS includes: a rendering operation circuit 2 for performing a rendering operation; a rendering memory 3 for storing pixel data generated by rendering operation circuit 2; a display memory 5 for storing the pixel data from rendering memory 3 and for transferring the stored data to a display unit for display of image data by the display unit; and a memory control circuit 4 for controlling the transfer of the pixel data between rendering memory 3 and display memory 5.

Rendering processing system RS performs rendering processing. Specifically, it receives a rendering instruction and data from a geometrical operation unit 1, performs a rendering operation according to the received instruction and data, to generate pixel data representing an image of three-dimensional graphics, and sequentially outputs the generated pixel data via memories 3 and 5 to the display unit for display on a display screen thereof. Geometrical operation unit 1 generates and outputs each vertex data of a plurality of polygons constituting a figure and also generates the rendering instruction designating the rendering. One polygon is a minimal unit constituting the figure. Each of the vertex data includes: R, B and G values representing color information of red, blue and green, respectively; a two-dimensional coordinate (X, Y) indicating the location of the vertex on a screen (frame); a Z value indicating a location of corresponding vertex data in a depth direction; an $\alpha$ value indicating transparency of the vertex; and a coordinate (U, V) of a texture added to the vertex.

In order to generate the vertex data, geometrical operation unit 1 performs geometrical operations, modeling transformation, lighting calculation, clipping processing, field-of-view transformation, and viewport transformation. These geometrical operations are well known in the field of three dimensional graphic processing.

Rendering operation circuit 2 receives the rendering instruction and a plurality of vertex data from geometrical operation unit 1. In response to the received rendering instruction, and using the received plurality of vertex data, rendering operation circuit 2 performs the rendering operation to generate a plurality of pixel data corresponding to a plurality of pixels constituting a screen of a frame.

Rendering memory 3, also called a rendering (R) plane, retains a plurality of pixel data corresponding to the pixels of the screen of one frame supplied from rendering operation circuit 2. The pixel data corresponding to one pixel includes R, B and G values representing red, blue and green of corresponding pixel, respectively, and an $\alpha$ value representing the transparency of the corresponding pixel. Each of the R, B, G and $\alpha$ values is represented with 8 bits. The number of pixels per frame is determined by a display standard of the display unit to be used in the rendering processing system. The display standards include NTSC (National Television System Committee), VGA (video Graphics Array), SVGA (Super Video Graphics Array), and XGA (Extended Graphics Array).

Rendering operation circuit 2 and rendering memory 3 are interconnected by a bidirectional data bus. Rendering operation circuit 2 writes pixel data generated by the rendering operation into rendering memory 3, and reads again the pixel data written into rendering memory 3 out of rendering memory 3 to generate new pixel data using the pixel data read out. Repeating such processes as many a number of times as required, final pixel data of one frame to be displayed are generated. Once rendering operation circuit 2 stores the pixel data of one frame into rendering memory 3, the data retained in rendering memory 3 are transferred to a display memory 5 under the control of memory control circuit 4. At this time, the data are transferred with a prescribed bit removed therefrom. In the first embodiment, 8 bits representing the $\alpha$ value are removed from each pixel data, and only 24 bits representing the R, G and B values of each pixel data are transferred to display memory 5 under the control of memory control circuit 4.

Display memory 5, also called a display (D) plane, stores pixel data for a plurality of pixels constituting one frame, each pixel data including only the R, G and B values excluding the $\alpha$ value. By performing raster scanning on display memory 5, the pixel data are sequentially read out of display memory 5. More specifically, the pixel data are read out from display memory 5 in an order in which the pixels are displayed on a scanning line. The pixel data read out from display memory 5 are sent to the display unit via a digital/analog converter (DAC) or the like. The display unit displays images on its display screen, based on the received pixel data. For display of an image, the α value is unnecessary. What should be stored in display memory 5 is only the R, G and B values.

Memory control circuit 4 controls accesses to rendering memory 3 and display memory 5 such that bidirectional data transfer is effected between rendering memory 3 and rendering operation circuit 2 while data are transferred from rendering memory 3 to display memory 5.

The pixel data corresponding to pixels of all the frames generated by rendering operation circuit 2 are written into rendering memory 3 sequentially. The pixel data of each frame stored in rendering memory 3 are sequentially transferred to display memory 5 before updated by pixel data of a next frame.

Each of pixel data stored in display memory 5 does not include the α value, and the storage capacity of display memory 5 can be reduced. Thus, the total storage capacity of rendering memory 3 and display memory 5 used in the first embodiment becomes smaller than the total storage capacity of the two memories used in a conventional double buffering control.

Figure 2:
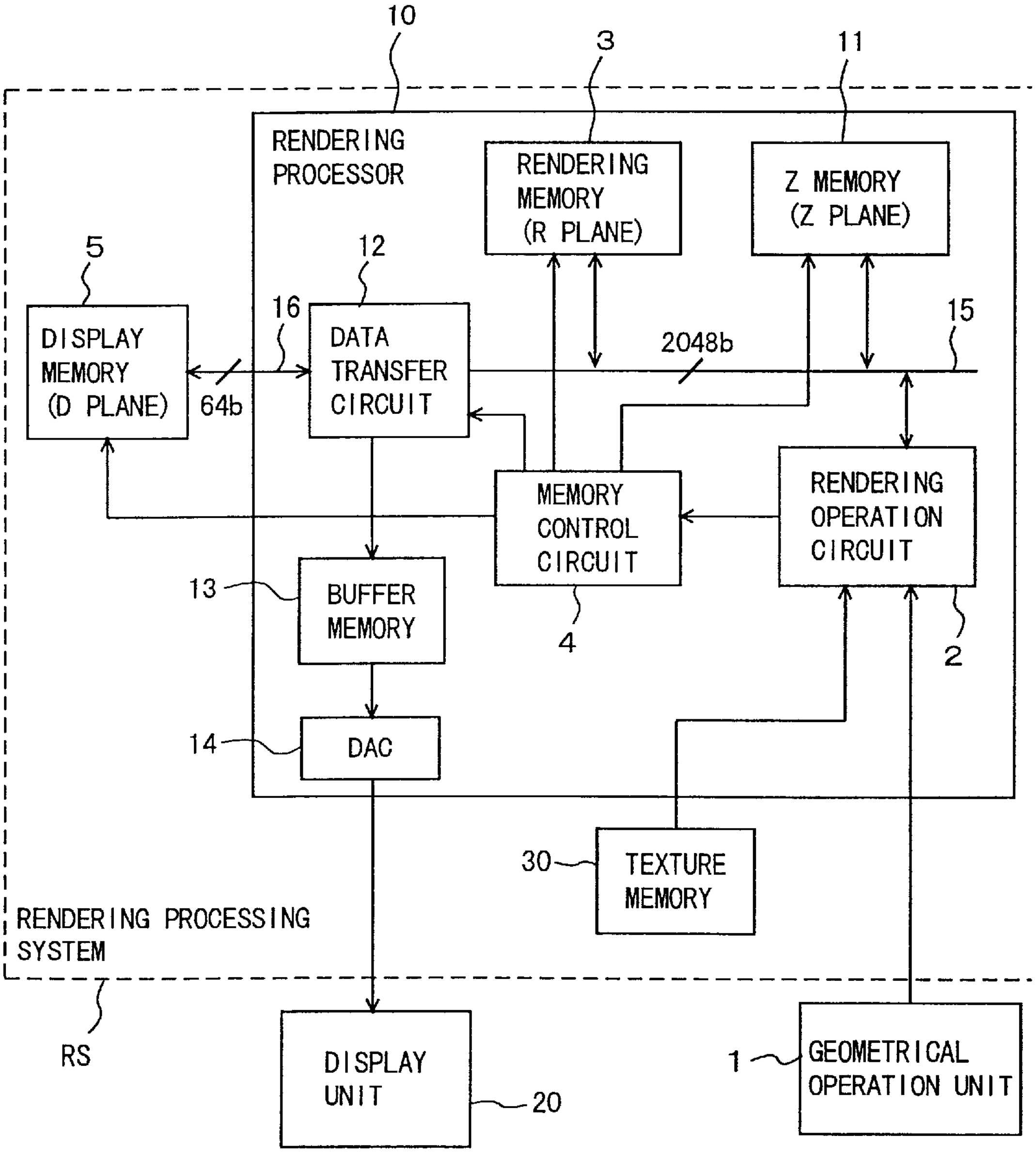
FIG. 2 is a diagram showing in more detail the configuration of the rendering processing system shown in FIG. 1.

FIG. 2 is a diagram showing in more detail the configuration of rendering processing system RS of FIG. 1. Referring to FIG. 2, in addition to rendering operation circuit 2, rendering memory 3, memory control circuit 4 and display memory 5 as shown in FIG. 1, rendering processing system RS includes: a Z memory 11 for storing a Z value; a data transfer circuit 12 for performing data transfer between rendering memory 3 and display memory 5 and between display memory 5 and the display unit; a buffer memory 13 for buffering the transfer of the pixel data from display memory 5 to the display unit; a digital/analogue converter (DAC) 14 for performing digital/analog conversion on the pixel data read out from buffer memory 13; and a texture memory 30 storing texture data of an image.

Z memory 11, also called a Z plane, stores a plurality of Z values corresponding to the plurality of pixels constituting one frame which are stored in rendering memory 3. Normally, each Z value is formed of 32 bits, and represents depth information (Z plane coordinate) of the pixel data. Z memory 11 has substantially the same storage capacity as that of rendering memory 3. Rendering memory 3 and Z memory 11 each are formed, for example, of a single port random access memory (RAM), preferably a dynamic RAM (DRAM).

Data transfer circuit 12 has its transfer operation controlled by memory control circuit 4. It receives a plurality of pixel data for one frame stored in rendering memory 3, and transfers the data, other than the α value, to display memory 5. Data transfer circuit 12 also receives a plurality of pixel data for one frame output from display memory 5 and transfers the same data to buffer memory 13.

Buffer memory 13 receives and temporarily stores the pixel data output from display memory 5, and transfers the stored data via DAC 14 to a display unit 20. Buffer memory 13 is formed, for example, of a dual port, first-in first-out (FIFO). Buffer memory 13 simply performs buffering of the data transfer from display memory 5 to DAC 14, and is not required to store one-frame worthy amount of the pixel data. Therefore, the storage capacity of buffer memory 13 is smaller than that of display memory 5. Further, buffer memory 13 is arranged such that the transfer rate (the number of bits transferred per unit time) in input of data from data transfer circuit 12 is made greater than the transfer rate in output of the data to DAC 14.

DAC 14 performs digital/analog conversion for the pixel data received from buffer memory 13, and outputs analog signals including three-color information of red, blue and green to display unit 20, such as a cathode ray tube (CRT). DAC 14 also generates a horizontal synchronization signal (Hsync) and a vertical synchronization signal (Bsync) for output to display unit 20. A screen size is predetermined according to a system adopted by display unit 20, and therefore, the number of pixels on one scanning line and the number of pixels in one frame are preset. Therefore, DAC 14 counts the pixel data transferred from buffer memory 13, and generates the horizontal and vertical synchronization signals at every prescribed number of pixel data in the horizontal scanning lines.

Texture memory 30 stores texture data to be mapped to each polygon constituting a figure. Rendering operation circuit 2 accesses texture memory 30 according to the texture coordinate (U, V) received from geometrical operation unit 1, and maps necessary texture data to corresponding polygon.

Memory control circuit 4 controls data reading and writing for rendering memory 3, Z memory 11 and display memory 5 by providing these memories with an operation control signal along with an address representing where the data should be written or read, according to a designation issued by rendering operation circuit 2.

Memory control circuit 4 further controls data transfer circuit 12 to control data transfer from rendering memory 3 to display memory 5, as well as data transfer from display memory 5 to buffer memory 13. In particular, memory control circuit 4 controls a timing for data transfer from rendering memory 3 to display memory 5 and a timing for data transfer from display memory 5 to buffer memory 13, to prevent disturbance of an image displayed on the screen of display unit 20. Memory control circuit 4 further controls operation timings of rendering memory 3, display memory 5 and data transfer circuit 12, to prevent dropping of the pixels to be displayed on the display unit.

Data transfer circuit 12, rendering memory 3, Z memory 11 and rendering operation circuit 2 are interconnected via an internal data bus 15 of a width of 2048 bits. Internal data bus 15 is equivalent to a data bus arranged between rendering operation circuit 2 and rendering memory 3 for bidirectional transfer of data therebetween in FIG. 1. Via this internal data bus 15, pixel data are transferred in both directions between rendering operation circuit 2 and rendering memory 3, and Z values are bidirectionally transferred between rendering operation circuit 2 and Z memory 4. Pixel data are also transferred via internal data bus 15 from rendering memory 3 to data transfer circuit 12.

Data transfer circuit 12 is interconnected with display memory 5 by a bidirectional data bus 16 having a width of 64 bits. This data bus 16 is equivalent to a data bus for transfer of pixel data from rendering memory 3 to display memory 5 in FIG. 1. In the configuration shown in FIG. 2, data transfer circuit 12 performs data transfer between rendering memory 3 and display memory 5 and between display memory 5 and buffer memory 13. Thus, data bus 16 between data transfer circuit 12 and display memory 5 transfers the pixel data in both directions.

Rendering operation circuit 2, rendering memory 3, memory control circuit 4, Z memory 11, data transfer circuit 12, buffer memory 13 and DAC 14 are integrated on a common semiconductor chip to form one semiconductor integrated circuit. Such a semiconductor integrated circuit apparatus including a rendering operation circuit is normally called a rendering processor or a graphics accelerator.

Internal data bus 15 is a data bus internal to such rendering processor 10, and can be made much wider in bus width (bit width) than that of data bus 16 formed of on-board wiring. The bus width of internal data bus 15 in the present embodiment is 2048 bits. Thus, internal data bus 15 can have a bus width of several K bits (because the bus width is not limited by the pin terminals of rendering memory 3 and Z memory 11, but restricted by interconnection pitch of the internal data bus in rendering processor 10).

Display memory 5 is formed of a semiconductor chip provided separate from that of rendering processor 10, and is configured, for example, on a single port RAM (preferably a DRAM). Thus, data bus 16 is formed of on-board wiring lines, and is restricted in bit width by the number of data input/output pin terminals of display memory 5. In the present embodiment, data bus 16 has a bus width of 64 bits. Data bus 16 can have a bus width of some tens to hundreds of bits (determined by the number of data input/output pins of display memory 5).

Texture memory 30 is formed of still another semiconductor chip separate from those of rendering processor 10 and display memory 5. Texture memory 30 only stores texture data of each polygon, and is not required to transfer a large amount of texture data at one time. Therefore, a narrow bus width between texture memory 30 and rendering operation circuit 2 causes no significant problems. Now, an operation by rendering operation circuit 2 for writing pixel data into rendering memory 3 will be described in brief in conjunction with FIG. 3.

Now, it is assumed that, in one frame (screen) 40, a figure 41 is being rendered on a given background color, and another figure 42 is being rendered in front of figure 41. Rendering operation circuit 2 first clears the contents stored in rendering memory 3 via internal data bus 15, and stores R, G and B values representing the background color and an α value representing the transparency being 0 in rendering memory 3. Rendering operation circuit 2 further stores a Z value representing the farthest location, via internal data bus 15 to Z memory 11.

Figure 3:
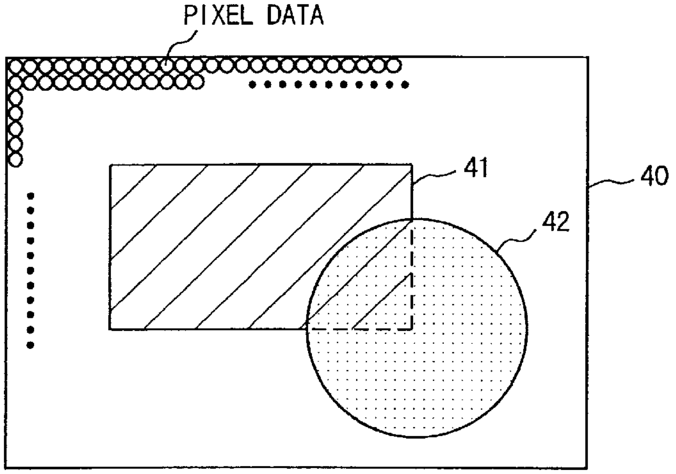
FIG. 3 is a diagram showing an example of a figure rendered by a rendering operation circuit shown in FIG. 2.

Then, rendering operation circuit 2, in response to an instruction from geometrical operation unit 1, reads out, from rendering memory 3 and Z memory 11 pixel data and Z values corresponding to a shaded region in which figure 41 is rendered in FIG. 3, to generate pixel data and Z values for entire figure 41. Rendering operation circuit 2 then performs hidden surface removing process (performs a Z operation) of comparing the Z values read out from Z memory 11 and the produced Z values of figure 41 to validate the color of figure 41 placed in front of the background. The Z values of figure 41 are then transferred via internal data bus 15 to Z memory 11, and the Z values of the pixels corresponding to figure 41 in the frame are updated. Further, rendering operation circuit 2 performs a translucent operation (α blending operation) of blending the color information (R, G and B values) of pixel data read out from rendering memory 3 and the color information (R, G and B values) of pixel data of figure 41, based on the α values of pixel data of the background read out from rendering memory 3 and the α values of figure 41. The color information (R, G and B values) and corresponding α values obtained by this translucent operation are transferred via internal data bus 15 to rendering memory 3, and the pixel data in the frame corresponding to figure 41 are updated by the newly produced pixel data.

Next, rendering operation circuit 2 generates pixel data and Z values for entire figure 42, and also reads out the pixel data and Z values corresponding to the region on the frame in which figure 42 is being rendered, from rendering memory 3 and Z memory 11, respectively. Rendering operation circuit 2 compares the read out Z values and the generated Z values of figure 42, and according to the comparison result, validates the color of figure 42 in the forefront. The Z values of figure 42 are transferred via internal data bus 15 to Z memory 11, and the Z values of the pixels in the region corresponding to figure 42 are updated. Further, rendering operation circuit 2 performs the translucent operation of blending the color information (R, G and B values) of the pixel data read out from rendering memory 3 and the color information (R, G and B values) of the corresponding pixel data in figure 42 based on the α values of the pixel data read out from rendering memory 3 and the α values of pixel data in figure 42. The color information (R, G and B values) and the α values obtained by the translucent operation are transferred via internal data bus 15 to rendering memory 3, and the pixel data corresponding to figure 42 in frame 40 are updated.

In general, more figures than those shown in FIG. 3 are rendered. Accordingly, rendering operation circuit 2 needs to perform operations for reading pixel data from and writing new pixel data to rendering memory 3 a larger number of times. Similarly, rendering operation circuit 2 also has to perform operations for reading Z values from and writing new Z values to Z memory 11 an increased number of times. Therefore, rendering operation circuit 2, rendering memory 3 and Z memory 11 are preferably configured on the same semiconductor chip so that an adequately large access band width can be secured for rendering memory 3 and Z memory 11 that are accessed an extremely large number of times. The memory access band width represents the number of bits read out from or written into a memory per unit time and is expressed, for example, by a numerical value of an operation frequency of memory times a bit width of data bus. Thus, by configuring apparatus into a single chip apparatus, it is possible to implement the internal data bus with internal interconnection lines to ensure a sufficiently large bus width.

Figure 4:
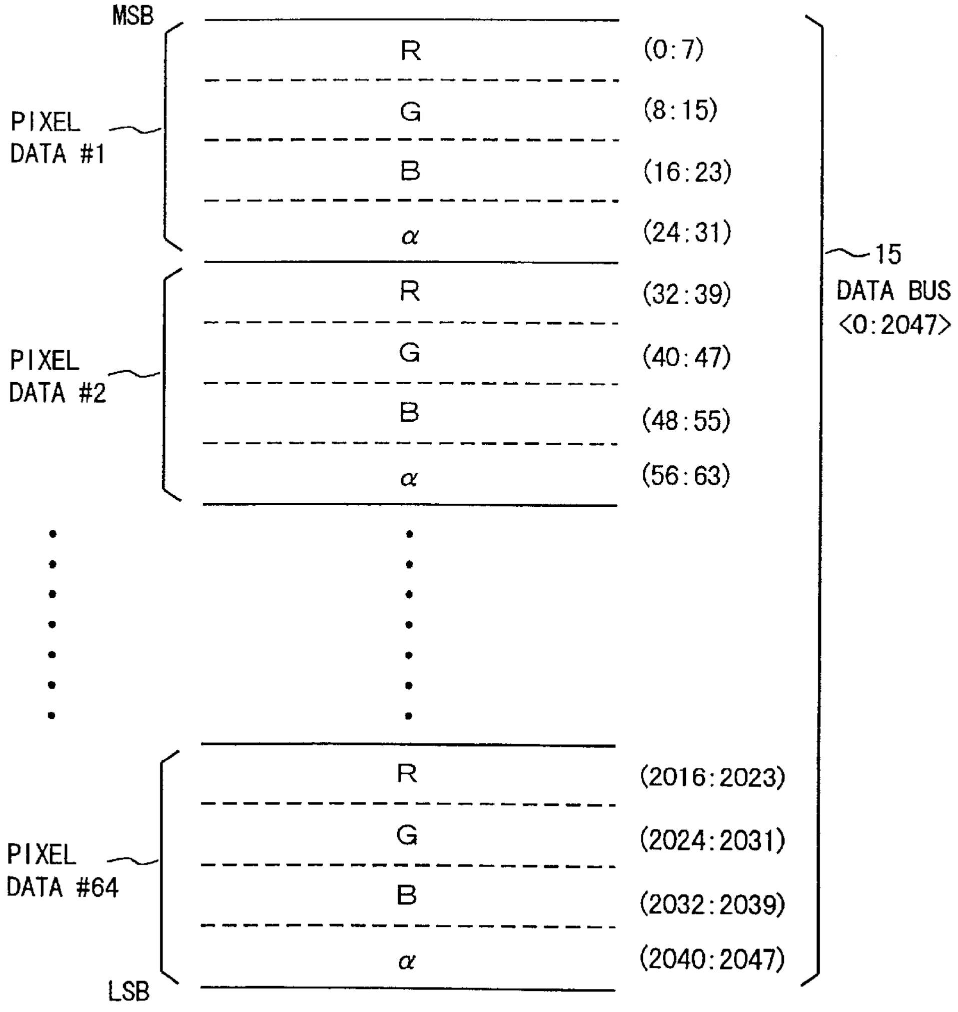
FIG. 4 is a diagram showing a structure of data transferred on a data bus shown in FIG. 2.

FIG. 4 shows a structure of pixel data transferred on internal data bus 15. Internal data bus 15 has a bus width of 2048 bits with bus lines numbered from the most significant bit number 0 to the least significant bit number 2047. Of these bus lines with bits <0:2047> of internal data bus 15, each bus lines of 32 bits from the upper bit side (having a smaller bit number) are used to transfer one piece of pixel data. Therefore, the data <0:2047> transferred on internal data bus 15 at one time include 64 pixel data #1-#64. That is, when one address is supplied from memory control circuit 4 to rendering memory 3, 64 pixel data from rendering memory 3 are transferred in parallel onto internal data bus 15. As for the pixel data, R, G, B and α values are each of 8 bits, and have their position fixed on corresponding data bus lines sequentially from the upper bit side, and transferred on internal data bus 15.

When the pixel data are transferred on internal data bus 15, the bit locations on which the R, G, B and α values of each pixel data are transferred are uniquely determined. For example, the R values are not transferred through bus lines other than bus lines <0:7>, <32:39>, <2016:2023>. The G values are transferred exclusively through bus lines <8:15>, <40:47>, . . . <2024:2031>. The B values are transferred through only bus lines <16:23>, <48:55>, . . . <2032:2039>. Likewise, the α values are transferred exclusively through bus lines <24:31>, <56:63>, . . . <2040:2047>. The bus line at the most significant bit is the one having a bit number 0. The bus line at the least significant bit is the one having a bit number 2047. In each group of the data bus lines, the color information and α value of each pixel data each have an upper bit transferred through an upper bit location of a corresponding bus line group.

Figure 5:
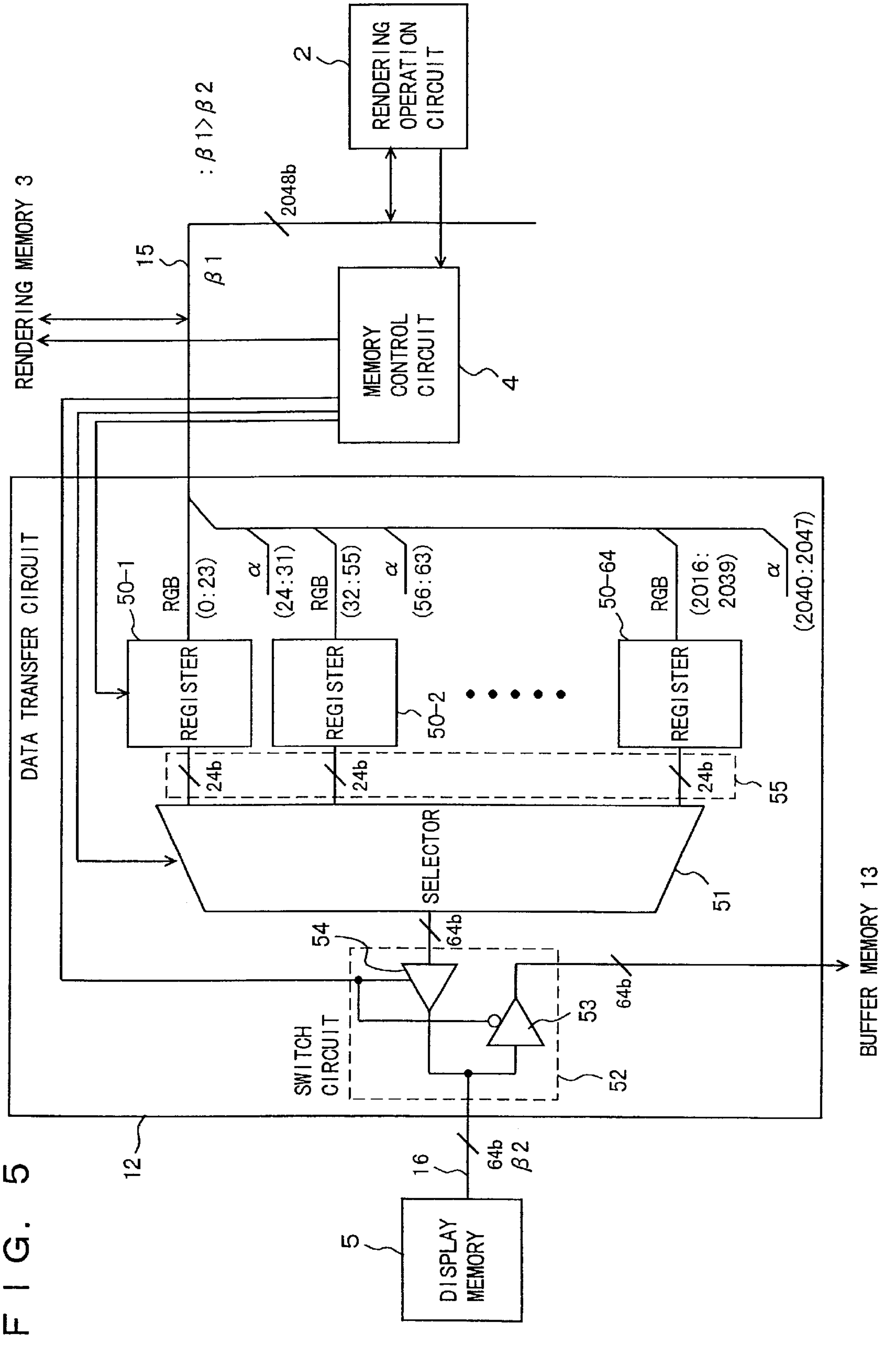
FIG. 5 is a diagram showing a configuration of a data transfer circuit shown in FIG. 2.

FIG. 5 schematically shows a configuration of data transfer circuit 12 of FIG. 2. Referring to FIG. 5, data transfer circuit 12 includes registers 50-1 to 50-64 provided in parallel to internal data bus 15. Registers 50-1 to 50-64, each having a capacity of 24 bits, are provided corresponding to 64 pieces of pixel data transferred in parallel on internal data bus 15, and store color information (R, G and B values) of corresponding pixel data. The α values transferred on internal data bus 15 are not stored. For example, bus lines <0:23> of internal data bus 15 are coupled to register 50-1, while bus lines <24:31> are separated from register 50-1. Similarly, register 50-2 is connected to bus lines <32:55> of internal data bus 15, and separated from bus lines <56:63>. Other registers are coupled to corresponding bus lines in the same manner, and no register stores the α value. Memory control circuit 4 controls the timings of registers 50-1 to 50-64 for taking in and storing the received data.

Data transfer circuit 12 further includes: a selector 51 connected via a data bus 55 to registers 50-1 to 50-64 in parallel for sequentially selecting each 64 bits from internal data bus 55 starting from an upper bit under the control of memory control circuit 4; and a switch circuit 52 for transferring the pixel data bits selected by selector 51 to display memory 5 and for transferring the data read out from display memory 5 to buffer memory 13.

Internal data bus 55 has sub data buses of 24 bits provided corresponding to registers 50-1 to 50-64, respectively. Selector 51 transforms the data of 1536 bits on internal data bus 55 to 24 pieces of transfer data each consisting of 64 bits for sequential transfer. The number of bits output from selector 51, i.e., 64 bits, corresponds to the bit width of data bus 16 to which display memory 5 is connected. Thus, the 64 pixel data read out from rendering memory 3 by one access are stored to display memory 5 via switch circuit 52 by performing transferring operations 24 times.

Switch circuit 52 includes: a buffer circuit 54 that is activated in an operation mode of transferring the pixel data read out from rendering memory 3 to display memory 5 under the control of memory control circuit 4; and a buffer circuit 53 that is activated under the control of memory control circuit 4 when the pixel data are transferred from display memory 5 to a display unit. These buffer circuits 53 and 54 are activated complementarily, and they each attain an output high impedance state when inactivated. Buffer circuits 53 and 54 each transfer data of 64 bits. Now, the operation of data transfer circuit 12 shown in FIG. 5 will be described.

Rendering operation circuit 2 provides memory control circuit 4 with a control signal designating completion of writing of pixel data for one frame to rendering memory 3. In response, memory control circuit 4 controls rendering memory 3 to read out the pixel data for one frame to be stored in display memory 5. With one access, 64 pixel data are read out in parallel from rendering memory 3. Such an access is repeated for several times until the pixel data for one frame are completely read out from rendering memory 3.

In a mode of storing pixel data to display memory 5, in data transfer circuit 12, buffer circuit 54 of switch circuit 52 is activated, while buffer circuit 53 is inactivated. Of the pixel data of 2048 bits transmitted via internal data bus 15, registers 50-1 to 50-64 store the color information (R, G and B values) of 1536 bits excluding the α values, under the control of memory control circuit 4. Registers 50-1 to 50-64 store in parallel 64 pieces of pixel data read out in parallel from rendering memory 3.

Then, selector 51 selects pixel data in a unit of 64 bits in an order starting from register 50-1, for transference to display memory 5 via buffer circuit 54. Therefore, selector 51 performs the selecting operation 24 times, and 24 pieces of transfer data of 64 bits each are serially transferred via buffer circuit 54 and stored into display memory 5. Memory control circuit 4 controls rendering memory 3 to ensure that all the pixel data of 1536 bits stored in registers 50-1 to 50-64 are completely supplied to display memory 5 before next 64 pieces of pixel data are read out onto internal data bus 15.

The memory access band width β2 in transference of data on data bus 16 may be smaller than the memory access band width β1 in transference of data on internal data bus 15. This is because the pixel data for one frame, excluding α values, are required to be written into and read out from display memory 5 just one time and thus, the number of accesses to display memory 5 is much less than that to rendering memory 3. Further, the value of memory access band width β2 on data bus 16 is limited by a data transfer rate at which image data are transferred to the display unit, and thus, a large value is unnecessary for the band width β2.

Thus, data bus 16 may have a bus width smaller than that of internal data bus 15. It means that a necessary memory access band width β2 can be secured even when display memory 5 is formed of a semiconductor chip separate from that of rendering processor 10, and rendering processor 10 and display memory 5 are interconnected via on-board wiring lines. On the other hand, internal data bus 15, having an extremely large data amount to be transferred thereon, is integrated onto the same semiconductor chip with rendering operation circuit 2 and rendering memory 3 and formed of on-chip internal interconnection lines. Thus, rendering operation circuit 2 can transfer necessary pixel data at high speed, and can perform the rendering operation at high speed.

Once the writing of pixel data for one frame other than the α values to display memory 5 is completed, memory control circuit 4 controls display memory 5 to read the pixel data from display memory 5 to start display of an image on display unit 20. Display memory 5 receives addresses and other control signals from memory control circuit 4 and outputs data of 64 bits to rendering processor 10 several times. In data transfer circuit 12, buffer circuit 53 in switch circuit 52 is activated by memory control circuit 4, and sequentially transfers the data of 64 bits received from display memory 5, to buffer memory 13. Buffer circuit 54 is in an inactive state, and therefore, conflict of transfer data within switch circuit 52 is prevented.

Once the writing of pixel data for one frame to display memory 5 is completed, rendering operation circuit 2 uses internal data bus 15 to generate pixel data for a next frame to be written into rendering memory 3. Rendering operation circuit 2 is capable of generating the pixel data for a next frame and writing the generated pixel data to rendering memory 3, in parallel with its operation of transferring the pixel data of one frame (the current frame) from display memory 5 to buffer memory 13.

Even in the case where the transfer of pixel data of the current frame from display memory 5 to buffer memory 13 is not completed at the time when the writing of all the pixel data for a next frame to rendering memory 3 is completed, it is possible to transfer the pixel data for the next frame from rendering memory 3 to display memory 5. It should be understood, however, that memory control circuit 4 controls pixel data transferring operations of rendering memory 3 and display memory 5 to ensure that writing of the pixel data for the next frame is permitted only to a memory cell having the storage pixel data already been read out in display memory 5, and that the pixel data stored in a memory cell in display memory 5 are prevented from being updated before read out therefrom.

The transfer rate β3 of data output from buffer memory 13 is determined by the screen size (number of pixels) and the frame rate (number of frames displayed per unit time) of display unit 20. For screen display with no disturbance of images on display unit 20, buffer memory 13 is required to constantly retain data of an amount enough to transfer the pixel data to DAC 14 without disturbing transfer rate β3.

As previously described, buffer memory 13 is configured to have a greater data transfer rate for its input than for its output. Upon transferring the same amount of data, the time required to transfer the data from display memory 5 to buffer memory 13 is shorter than the time required to transfer the data from buffer memory 13 to DAC 14. Therefore, even when the operation of transferring the pixel data of the current frame from display memory 5 to buffer memory 13 and the operation of transferring the pixel data of a next frame from rendering memory 3 to display memory 5 are switched alternately, the pixel data can be supplied to buffer memory 13 without disturbing the transfer rate of the data to be transferred to DAC 14. In this case, the transfer rate of the pixel data which buffer memory 13 receives from display memory 5 via data transfer circuit 12 is of the same order as the memory access band width β2 of display memory 5.

Figure 6A:
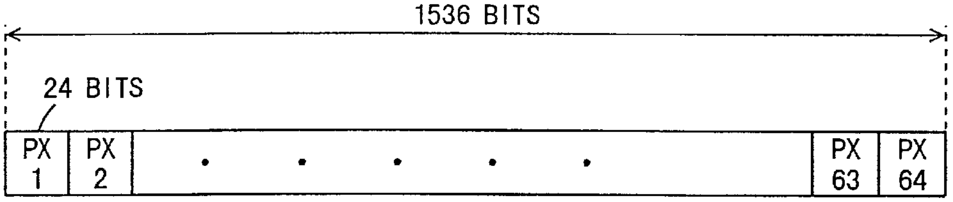
FIGS. 6A–6D are diagrams representing the configuration of the image data transferred by the data transfer circuit shown in FIG. 5 and the transferring procedures.

Now, it is assumed that registers 50-1 to 50-64 of data transfer circuit 12 store pixel data PX1 to PX 64 as shown in FIG. 6A. Pixel data PX1-PX64 each include color information of 24 bits, with the total bits of pixel data PX1-PX64 being 1536 bits.

Selector 51 divides the data of 1536 bits into transfer data of 64 bits each, and performs selecting and transferring operations 24 times in all.

Figure 6B:
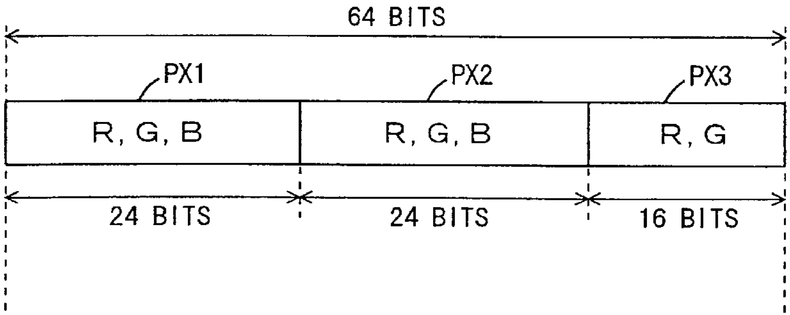

Referring now to FIG. 6B, in the first transfer cycle, pixel data PX1 and PX2, and the R and G values of 16 bits in total of pixel data PX3 are selected for transference to display memory 5.

Figure 6C:
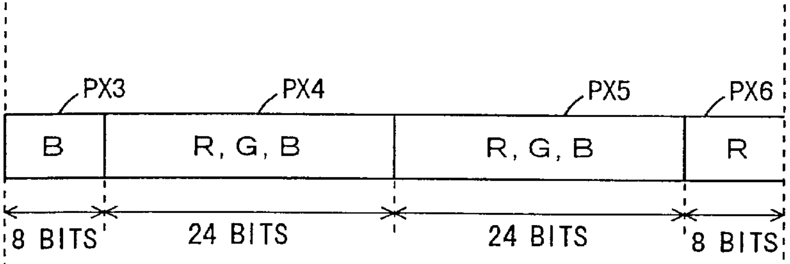

Then, as shown in FIG. 6C, in the next transfer cycle, the remaining B value of 8 bits of the color information of pixel data PX3, pixel data PX4 and PX5 containing color information of 24 bits each, and the R value of 8 bits of the color information of pixel data PX6 are transferred in parallel.

Figure 6D:
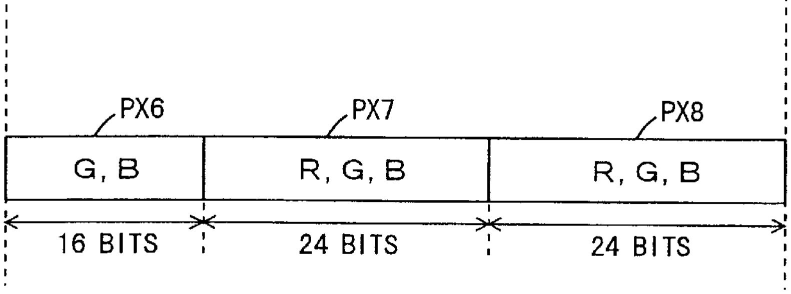

Next, as shown in FIG. 6D, in the next transfer cycle, the remaining G and B values of 16 bits of pixel data PX6, and pixel data PX7 and PX8 containing color information of 24 bits each are transferred in parallel. There are 24 transfer cycles in total, with a set of pixel data transfers as shown in FIGS. 6B through 6D being repeated 8 times. Thus, in display memory 5, there exists a situation in which one piece of pixel data is stored over two addresses. As shown in FIG. 4, however, the color information of 24 bits in each pixel data has the consistent bit locations for the R, G and B values. By virtue of this feature, the R, G and B values are selected in units of pixels at the time of transfer from buffer memory 13 to DAC 14.

Figure 7:
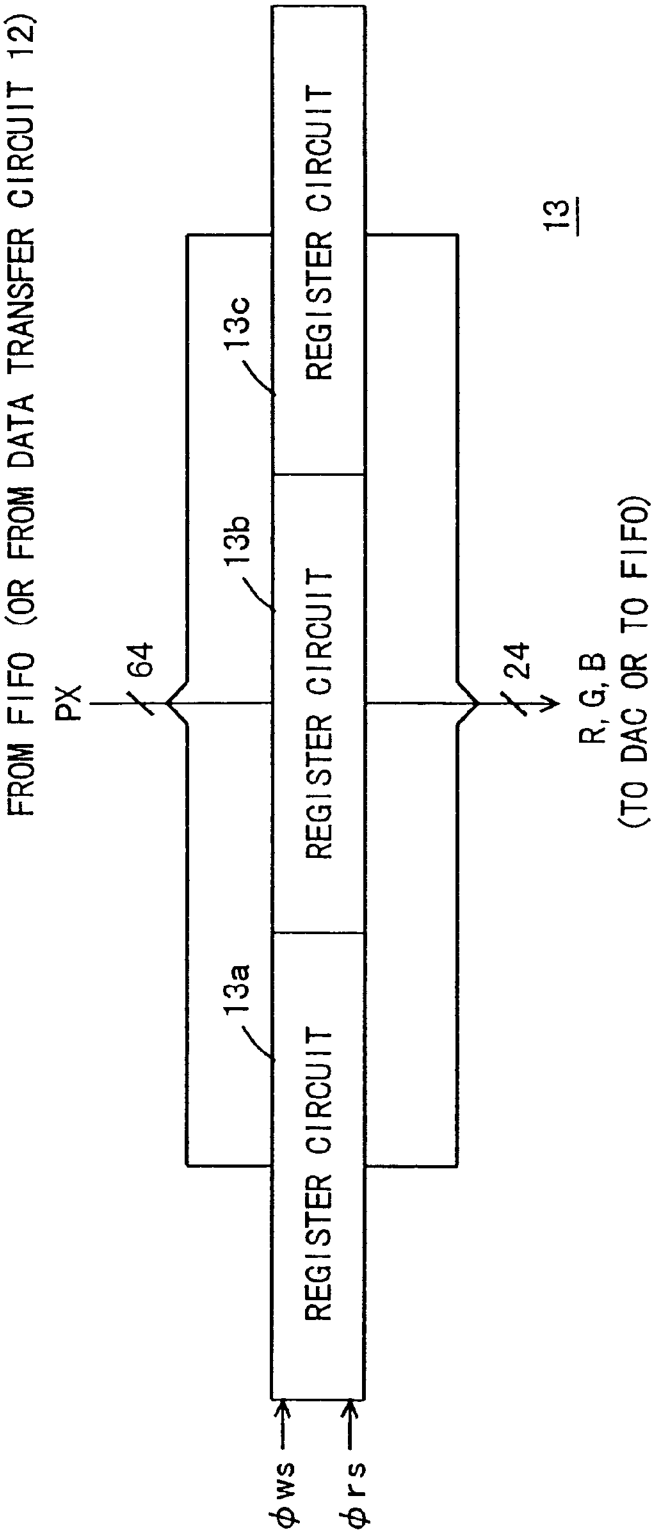
FIG. 7 is a diagram schematically showing a configuration of a main portion of a buffer memory shown in FIG. 2.

FIG. 7 schematically shows a configuration of a main portion of buffer memory 13. Buffer memory 13 includes: register circuits 13*a*, 13*b* and 13*c* provided in parallel with one another, having storage capacity of 64 bits each; and a first-in first-out (FIFO) provided at a preceding or succeeding stage of register circuits 13*a*-13*c*. Data are written into register circuits 13*a*-13*c* in a unit of 64 bits, according to a write select signal ϕws. Specifically, one of register circuits 13*a*-13*c* takes in and stores data of 64 bits supplied from FIFO or data transfer circuit 12 according to write select signal ϕws.

Register circuits 13*a*-13*c* output data in a unit of 24 bits according to a read select signal ϕrs. Read select signal ϕrs selects data of 24 bits of one pixel, which contains color information (R, G and B values). The data of 24 bits read out from register circuits 13*a*-13*c* is supplied to the FIFO or the DAC in the succeeding stage. As shown in FIG. 4, the R, G and B values in each respective pixel data are arranged in the same locations. Thus, by sequentially storing 64 bit data to register circuits 13*a*-13*c* and then selecting therefrom the data in a unit of 24 bits, it is possible to accurately select the R, G and B values of one pixel for transmission to the succeeding circuit. Utilizing register circuits 13*a*-13*c* eliminates the necessity of complicated address translation for writing to or reading from display memory 5 to read out data in units of pixels. The transference of pixel data to DAC 14 can be readily performed in a unit of pixel data.

Write select signal ϕws and read select signal ϕrs may be supplied simultaneously at the time of writing/reading from memory control circuit 4 to buffer memory 13. Alternatively, the supplied write instructions and read instructions may be counted within buffer memory 13, and the write/read select signals may be generated using, for example, such count circuit. Write select signal ϕws and read select signal ϕrs are generated such that a register circuit subject to the writing and a register circuit for outputting pixel data differs from each other.

In the first embodiment, what is needed is that the bus width of internal data bus 15 is made greater than the bus width of data bus 16. These data buses 15 and 16 may have bus widths of any bits.

If there is an extra space in rendering processor 10, display memory 5 and rendering processor 10 may be integrated on the same semiconductor chip. In this case, the bit width of data bus 16 connecting display memory 5 and data transfer circuit 12 can be of several K bits, which enables rendering processing at higher speed.

Further, DAC 14 may be provided outside of rendering processor 10. Buffer memory 13 may also be provided outside of rendering processor 10. In data transfer circuit 12, registers 50-1 to 50-64 are provided in parallel corresponding to respective pixel data. However, registers 50-1 to 50-64 may be configured into one register storing data of 1536 bits.

Although rendering memory 3 is configured by a single port memory, it may alternatively be configured by a dual port memory. When a dual port memory is used as rendering memory 3, rendering memory 3 uses one port for bi-directional transference of pixel data to and from rendering operation circuit 2, and uses the other port for transfer of pixel data to display memory 5. If the other port is configured to have a width of 64 bits, it may be coupled to buffer circuit 54, with registers 50-1 to 50-64 of data transfer circuit 12 and selector 51 removed. Further, in this case, this multi-port rendering memory 3 has to be configured such that only the R, G and B values of pixel data are output from the other port. In this case, memory planes are simply provided corresponding to the R, G, B and α values in rendering memory 3, with its one port coupled to all the memory planes and the other port coupled to the memory planes storing the R, G and B values. The α values are input/output only via the one port.

In addition, besides internal data bus 15, another data bus may be provided such that Z data are transferred between rendering operation circuit 2 and Z memory 11 therethrough. Rendering operation circuit 2 can then perform data transfer with rendering memory 3 and data transfer with Z memory 11 in parallel with each other, thereby increasing the operation speed.

Moreover, rendering operation circuit 2 may be configured to perform its operation with hard-wired logic or by software.

Second Embodiment

Figure 8:
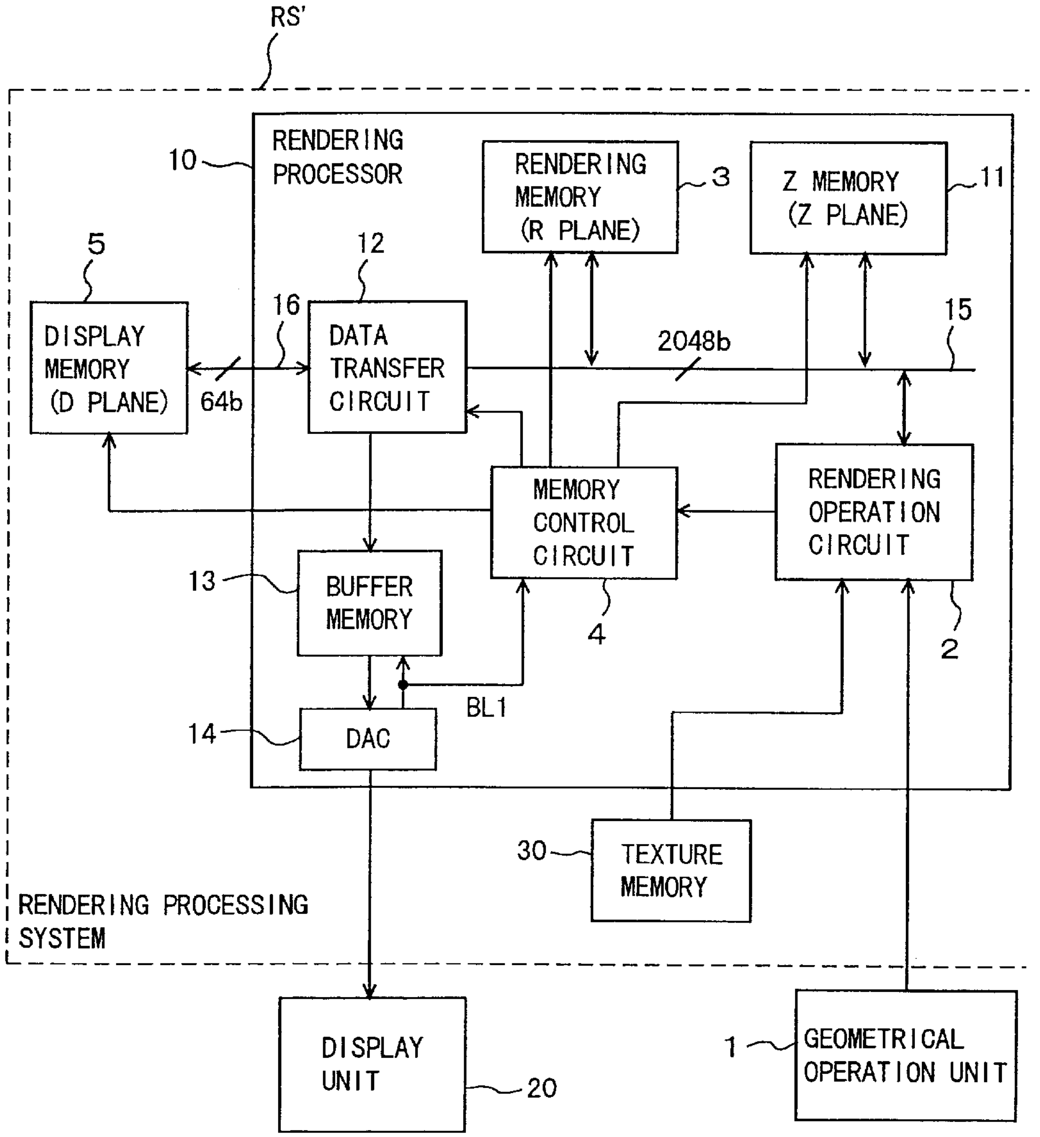
FIG. 8 is a diagram schematically showing an entire configuration of a rendering processing system according to a second embodiment of the present invention.

FIG. 8 schematically shows a configuration of a main portion of the rendering processing system RS according to the second embodiment of the present invention. In the configuration shown in FIG. 8, DAC 14 included in rendering processor 10 generates a blanking signal BL1 for application to buffer memory 13 and memory control circuit 4. Blanking signal BL1 indicates a horizontal blanking period generated when one scanning line completes upon display of image data on display unit 20. The other configurations are identical to those of the first embodiment, and the same reference characters/numerals denote the corresponding portions. Memory control circuit 4 uses blanking signal BL1 to control the timing of data transfer from rendering memory 3 to display memory 5.

Figure 9:
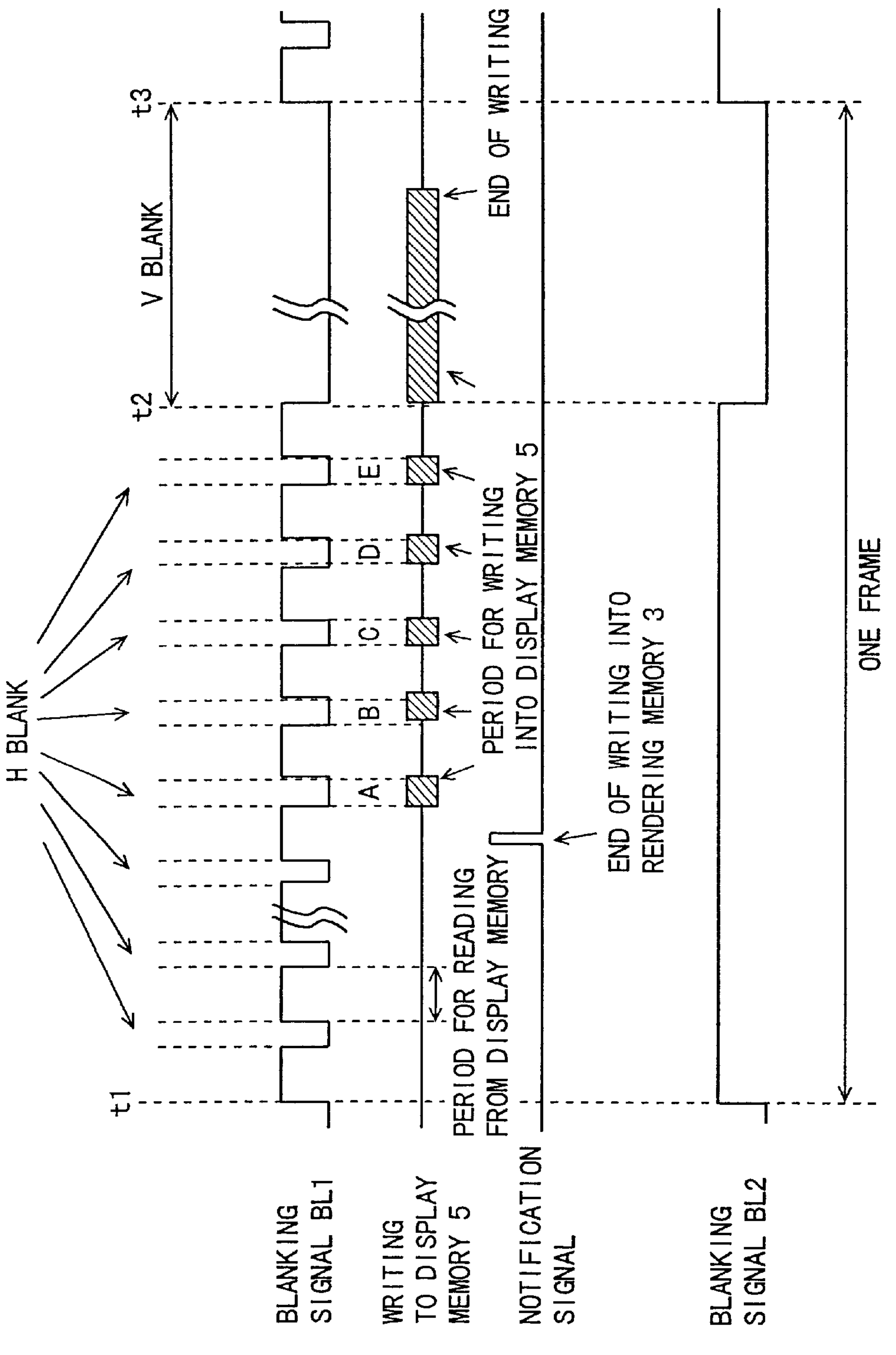
FIG. 9 is a diagram representing an operation sequence for writing pixel data into a display memory of the rendering processing system shown in FIG. 8.

FIG. 9 is a timing chart illustrating an operation of the rendering processing system according to the second embodiment of the present invention. Referring to FIG. 9, the period from time t1 to time t3 corresponds to a period in which one frame is displayed. The period from time t1 to time t2 is a period in which the image data are actually displayed on the screen of the display unit. During this period, blanking signal BL1 alternates between the H level and the L level. One H-level period of blanking signal BL1 indicates a period in which the screen is scanned horizontally from its one end to the other end in display unit 20 once. One L-level period of blanking signal BL1 indicates a period in which the scanning returns to the initial position at one end of the screen after the horizontal scanning is completed in display unit 20, and this period is normally called an "H blank (horizontal blank period)". The L-level period of blanking signal BL1 from time t2 to time t3 indicates a period in which the scanning returns in a vertical direction after the final horizontal scanning of one screen is completed for preparation of the first horizontal scanning for a next screen. This period is usually called a "V blank (vertical blank period)". Therefore, the period during which blanking signal BL1 is at the L level can be considered as a period in which no pixel data are supplied to display unit 20.

Now, referring to the timing chart of FIG. 9, the operation of the rendering processing system shown in FIG. 8 will be described. In rendering processor 10, buffer memory 13 receives blanking signal BL1 from DAC 14. When blanking signal BL1 is at the H level, buffer memory 13 outputs pixel data to DAC 14, whereas when blanking signal BL1 is at the L level, buffer memory 13 is prohibited from outputting the pixel data.

Blanking signal BL1 output from DAC 14 is also supplied to memory control circuit 4. Memory control circuit 4 controls data transfer circuit 12 and display memory 5 such that the pixel data of the (current) frame on display are transferred from display memory 5 to buffer memory 13 during the time period in which blanking signal BL1 is at the H level. Further, memory control circuit 4, in response to the L level of blanking signal BL1, determines whether transfer of the pixel data for a next frame from rendering memory 3 to display memory 5 should be started. In the case where the pixel data to be displayed that are stored in display memory 5 will be undesirably updated if the pixel data for the next frame are transferred to display memory 5, such transfer of pixel data for the next frame to display memory 5 is prohibited.

Rendering operation circuit 2 is able to start its operation for generating the pixel data for the next frame immediately after the completion of the transfer of the pixel data for the current frame from rendering memory 3 to display memory 5. When the writing of the pixel data for the next frame to rendering memory 3 is completed by this rendering operation processing, rendering operation circuit 2 generates and sends to memory control circuit 4 a notification signal being a pulse of an H level that indicates the completion of the writing of the pixel data for the next frame to rendering memory 3.

Memory control circuit 4 has a storage (not shown) inside the register, which is responsive to the H level of the notification signal for setting a value indicating the completion of writing to rendering memory 3 therein. Memory control circuit 4 controls operations of rendering memory 3, data transfer circuit 4 and display memory 5 such that, when blanking signal BL1 is at the L level and the notification signal storage (not shown) is set, the pixel data for the next frame are transferred from rendering memory 3 to display memory 5 during the H blanks A-E and the V blank, shown as shaded areas in FIG. 9, which in turn are generated after the writing to rendering memory 3 is completed. The writing of all the pixel data for the next frame to display memory 5 is completed within the V blank (due to the difference in the memory access band widths). With the completion of this writing, the notification signal storage is reset. The presence/absence of the next frame pixel data that should be transferred to display memory 5 is identified by referring to this notification signal storage.

In writing the pixel data for the next frame to display memory 5, the operations of rendering memory 3 and display memory 5 need to be controlled such that updating of the pixel data having not been read out from display memory 5 yet are prohibited. It is also necessary that a part of the pixel data for the next frame be transferred from display memory 5 to buffer memory 13 prior to time t3, in order for the screen corresponding to the next frame to be displayed from time t3. Rendering processor 10 transfers the pixel data for the next frame to display memory 5 while the screen of the current frame displayed on display unit 20, using the time periods in which the pixel data are not supplied to display unit 20. Thus, there occurs no conflict of pixel data in data transfer circuit 12. Display memory 5 transfers the pixel data via buffer memory 13 to DAC 14 while the current screen is displayed on display unit 20. Thus, the image of the current frame is free from disturbance. Further, blanking signal BL1 is utilized for control of writing and reading to and from display memory 5. Thus, the timing for switching the writing and reading to display memory 5 can be readily set, whereby the control of access to display memory 5 is simplified.

It is assumed that the rate of data transfer from data transfer circuit 12 to buffer memory 13 is the same as the rate of data transfer from buffer memory 13 to DAC 14, i.e., the input/output rates of data for buffer memory 13 are identical to each other. In this case, if it is possible to write all the pixel data for the next frame into display memory 3 within the blanking periods of the current frame, buffer memory 13 may be removed, and the pixel data may be transferred directly from data transfer circuit 12 to DAC 14. (Note that it is necessary to take out data in a unit of pixel data from the data of 64 bits in DAC 14.)

If the writing of pixel data to display memory 5 is performed at higher speed, the transfer of pixel data for the next frame from rendering memory 3 to display memory 5 may be performed only within the V blank period of the current frame. In this case, DAC 14 generates a blanking signal BL2 that attains an L level only in the V blank period, as shown in FIG. 9, for application to memory control circuit 4. In response to the L level of blanking signal BL2, memory control circuit 4 performs data transfer from rendering memory 3 to display memory 5. The numbers of pixels in the horizontal and vertical directions are determined according to the size of the screen of the display unit. Thus, by counting the number of pixel data transferred at DAC 14, it is readily possible to generate blanking signals BL1 and BL2.

Rendering memory 3 and rendering operation circuit 2 are integrated on the same chip, so that the writing of pixel data to rendering memory 3 can be performed at high speed. Thus, it is possible to complete the writing of pixel data for the next frame to rendering memory 3 before the start of the V blank of the current frame. The data transfer from rendering memory 3 to display memory 5 can be completed sufficiently only within the V blank period.

Third Embodiment

Figure 10:
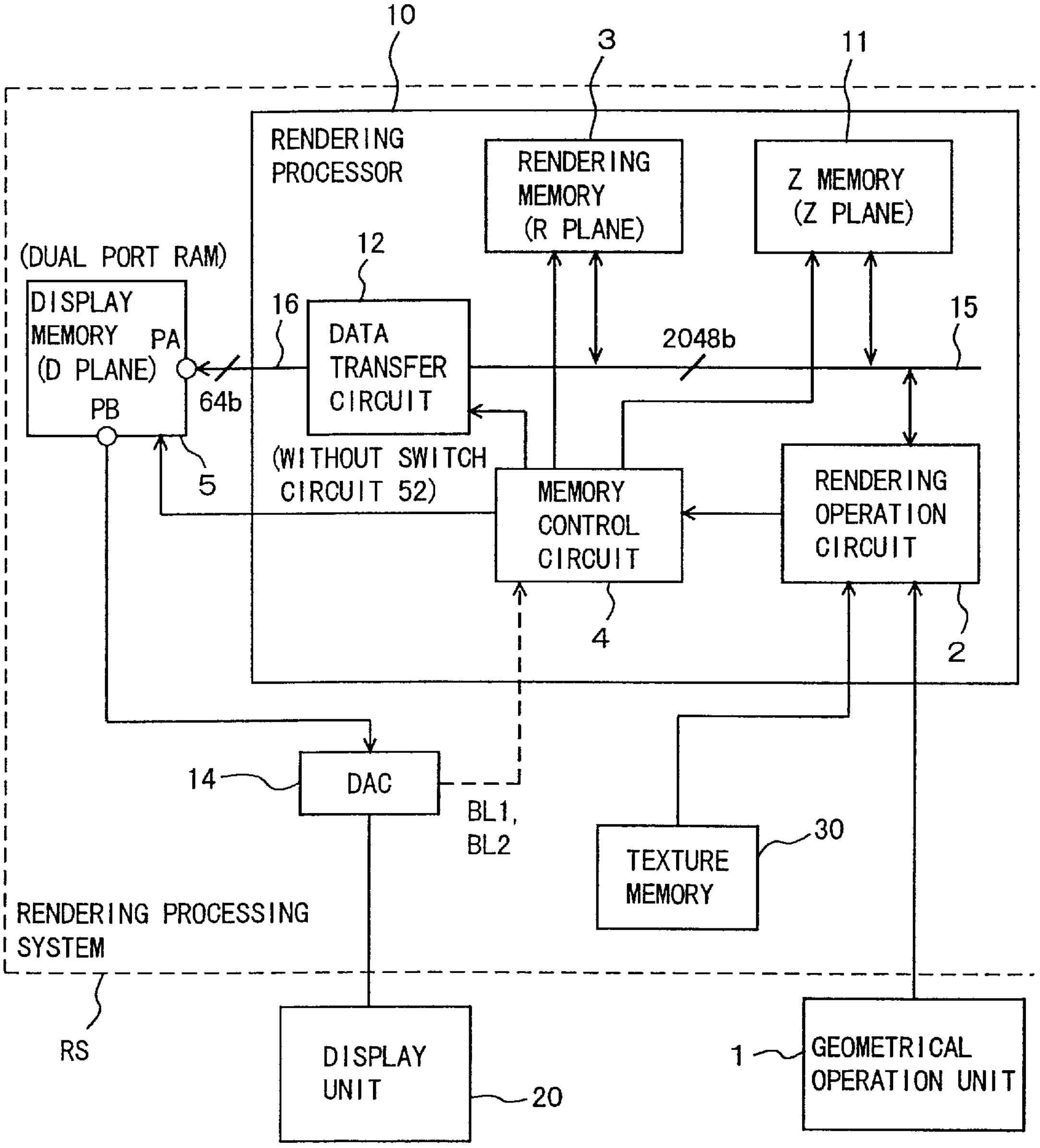
FIG. 10 is a diagram showing a configuration of a rendering processing system according to a third embodiment of the present invention.

FIG. 10 schematically shows a configuration of a main portion of the rendering processing system RS according to the third embodiment of the present invention. In rendering processing system RS of FIG. 10, a dual port memory (RAM) is utilized as display memory 5. Display memory 5 has a port PA coupled to data transfer circuit 12, and a port PB coupled to DAC 14. In the dual port memory, these ports PA and PB can perform input and output of data simultaneously. (In display memory 5, there occurs no address conflict, since memory control circuit 4 prohibits the update of the pre-displayed pixel data by the pixel data for a new frame.) Display memory 5 receives, at port PA pixel data for one frame output from data transfer circuit 12 for storage, and outputs the stored pixel data from port PB for transference to DAC 14. The pixel data transferred from data transfer circuit 12 and written into display memory 5 each consist of the color information (the R, G and B values) excluding the $\alpha$ values.

DAC 14 is provided outside rendering processor 10. Buffer memory 13 between data transfer circuit 12 and DAC 14 is unnecessary. In data transfer circuit 12, switch circuit 52 for switching the transfer direction of the pixel data is unnecessary. Buffer circuit 54 may be provided to drive data bus 16 formed of on-board wiring lines at high speed. Thus, in data transfer circuit 12, selector 51 shown in FIG. 5 divides the pixel data of 1536 bits into 24 pieces of data having 64 bits each, for sequential transference to display memory 5. The transfer rate in transferring data to port PA of display memory 5 is normally made greater than the transfer rate in reading out and transferring the data from port PB. The access to port PA of display memory 5 and the access to port PB are made independent of each other. Thus, it is possible to store the pixel data for the next frame in display memory 5 via port PA at the same time while the pixel data for one frame (the current frame) are read out from display memory 5 via port PB. Therefore, when the writing of the pixel data for the next frame to rendering memory 3 is completed, in parallel with reading out of the pixel data of the current frame, rendering processor 10 can transfer the pixel data for the next frame to display memory 5 for storage. However, it is necessary to prevent the update of the pixel data yet not read out from memory cells within display memory 5 by the pixel data of the current frame being read out. Thus, the data transfer from data transfer circuit 12 to display memory 5 can be effected after a lapse of a time period in which one-scanning-line worthy amount of pixel data, for example, is read out from display memory 5.

When data of 1536 bits can be written into one row (word line) through ports PA and PB of display memory 5, data are read out from port PB on a pixel basis, or in a unit of 24 bits, for application to DAC 14. This is readily implemented by simply making the allocation of column addresses different for port PA and for port PB. Alternatively, ports PA and PB may have the same address configurations if a register circuit as shown in FIG. 7 is provided between display memory 5 and DAC 14 to equivalently perform a buffering process. The reading of pixel data from display memory 5 is performed in a raster scan sequence, with the addresses generated using a counter, for example. By making different the number of bits of column addresses, it is possible to perform writing of 64 bit data from port PA and reading of data in a unit of 24 bits from port PB.

When a dual port memory (RAM) is used as display memory 5, data bus 16 is used for writing data into display memory 5. Thus, the transfer time period of the pixel data to display memory 5 is shortened (as the time period for transferring pixel data from the display memory to the buffer memory can hide the transfer time period of pixel data to display memory 5), and thus, the control of timing for transfer to display memory 5 becomes easier (as the timing conditions are alleviated).

Further, to simplify the control of data transfer to data transfer circuit 12, as in the previous second embodiment, DAC 14 may be configured to generate blanking signals BL1 and BL2 for application to memory control circuit 4, as shown by dotted lines in FIG. 10. Memory control circuit 4 transfers the pixel data for the next frame from rendering memory 3 to display memory 5 during at least the V blank among the blanking periods of the frame on display, according to blanking signals BL1 and/or BL2.

Fourth Embodiment

Figure 11:
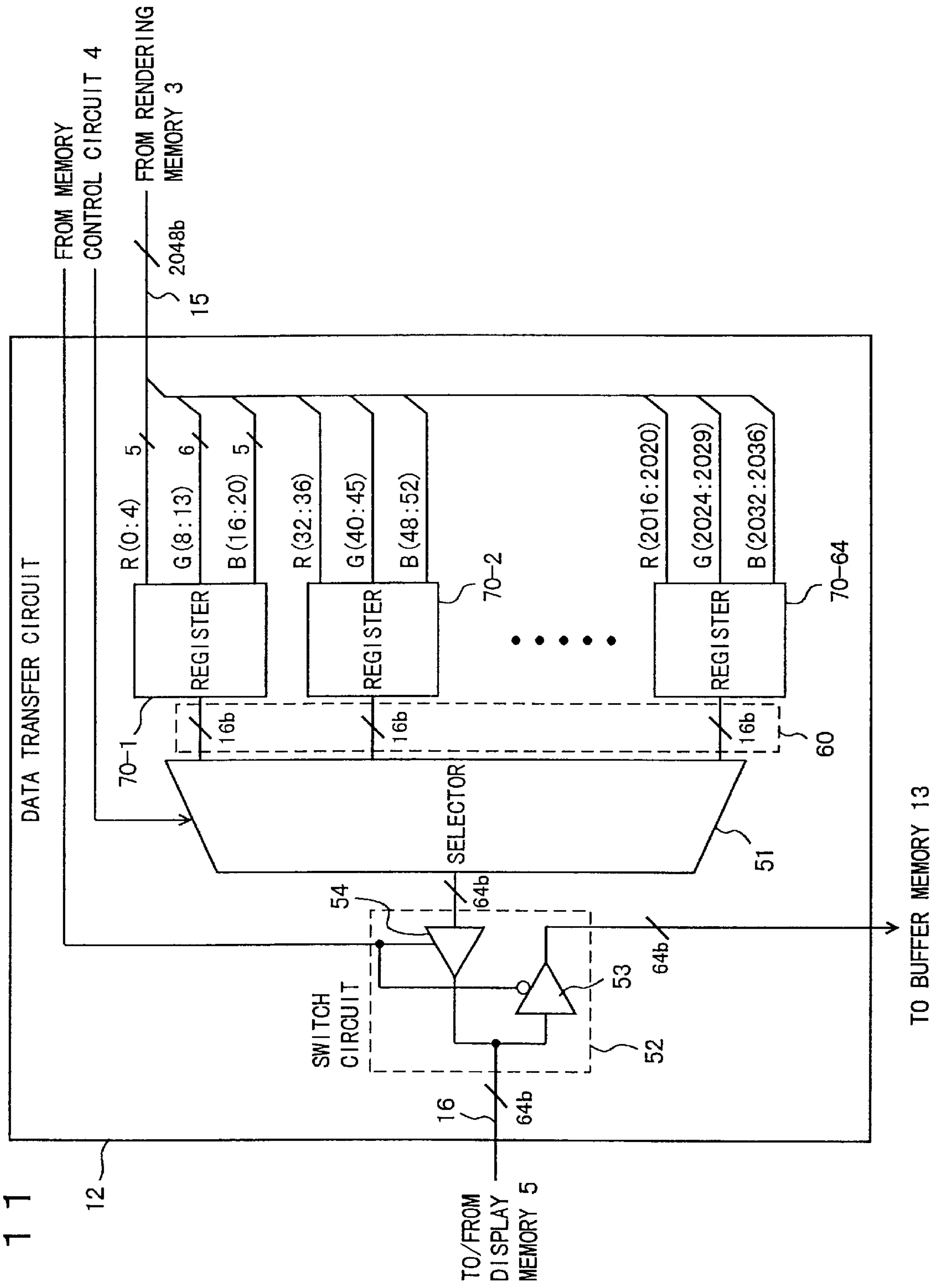
FIG. 11 is a diagram showing a configuration of a data transfer circuit shown in FIG. 10.

FIG. 11 schematically shows a configuration of data transfer circuit 12 according to the fourth embodiment of the present invention. Referring to FIG. 11, data transfer circuit 12 receives data of 32 bits per one pixel data stored in rendering memory 3, and transfers the data excluding the $\alpha$ value of 8 bits and a part of bits of each of the R, G and B values, to display memory 5. In data transfer circuit 12, registers 70-1 to 70-64 are provided corresponding to 64 pixels transferred on internal data bus 15. Registers 70-1 to 70-64 each store the R value of 5 bits with lowest 3 bits truncated from the original 8 bits, the G value of 6 bits with lowest 2 bits truncated from the original 8 bits, and the B value of 5 bits with lowest 3 bits truncated from the original 8 bits. The $\alpha$ values are not stored in registers 70-1 to 70-64. The information of 256 levels can be transferred by data of 8 bits. By truncating the lower bits, for example for the R value, the R information divided into 32 levels can be transferred. The minimum bit configuration for the pixel data with which a displayed image can be viewed by human eyes without feeling of strangeness is 5 bits, 6 bits and 5 bits for the R, G and B values, respectively. Thus, even when the lower bits are truncated from these R, G and B values in data transfer circuit 12, the image can be displayed at the display unit without strangeness sense to human eyes.

Thus, each of registers 70-1 to 70-64 stores only 16 bits in total, including the upper 5 bits of R value, the upper 6 bits of G value and the upper 5 bits of B value of corresponding pixel data. Therefore, in data bus 15, the bus lines for transferring of the entire α value, lowest 3 bits of R value, lowest 2 bits of G value, and lowest 3 bits of B value are not connected to registers 70-1 to 70-64.

For example, in register 70-1, the data R <0:4> of the upper 5 bits of the R value of 8 bits, the data G <8:13> of the upper 6 bits of the G value of 8 bits, and the data B <16:20> of the upper 5 bits of the B value of 8 bits are stored. Likewise, of the R, G and B values, the upper 5 bits of each of R and B value data and the upper 6 bits of the G value data are stored in each of registers 70-2 to 70-64.

With registers 70-1 to 70-64 each storing data of 16 bits, selector 51 is coupled to registers 70-1 to 70-64 via a data bus 60 of 1024 bits.

Selector 51 selects data of 64 bits in an order starting from the uppermost register 70-1, and sequentially transmits the data via buffer circuit 54 onto data bus 16. The data of 64 bits correspond to data for four pixels. The data are stored in display memory 5 for each four pixel data, and read out from display memory 5 in a unit of four pixel data. Thus, when the pixel data are transferred from buffer memory 13 to DAC 14, a complicated address translation is unnecessary, and one pixel data is simply selected from the four pixel data for transmission. In other words, when buffer circuit 54 of switch circuit 52 is activated and the pixel data are written into display memory 5, data transfer circuit 12 uses registers 70-1 to 70-64 and data bus 60 to extract the data of 1024 bits in total excluding the α value and the prescribed bits of each pixel data, from the data of 2048 bits read out from rendering memory 3 onto internal data bus 15. Selector 51 divides the data of 1024 bits into 16 pieces of transfer data in a unit of 64 bits, and transfers the data of 1024 bits in total to display memory 5 by performing serial transfers 16 times one for each transfer data of 64 bits. Memory control circuit 4 controls the operation of rendering memory 3 to ensure that the data of 1024 bits to be stored in registers 70-1 to 70-64 are all supplied to display memory 5 before the next 64 pieces of pixel data are read out onto data bus 15. In this case, data transfer to display memory 5 is repeated only 16 times. Thus, the number of times of data transfer, and hence the data transfer time can be reduced. Display memory 5 may be a dual port RAM, instead of the single port RAM, in which case the pixel data are transferred directly from the dual port memory (display memory) to the DAC, with buffer circuit 53 not provided.

Fifth Embodiment

Figure 12:
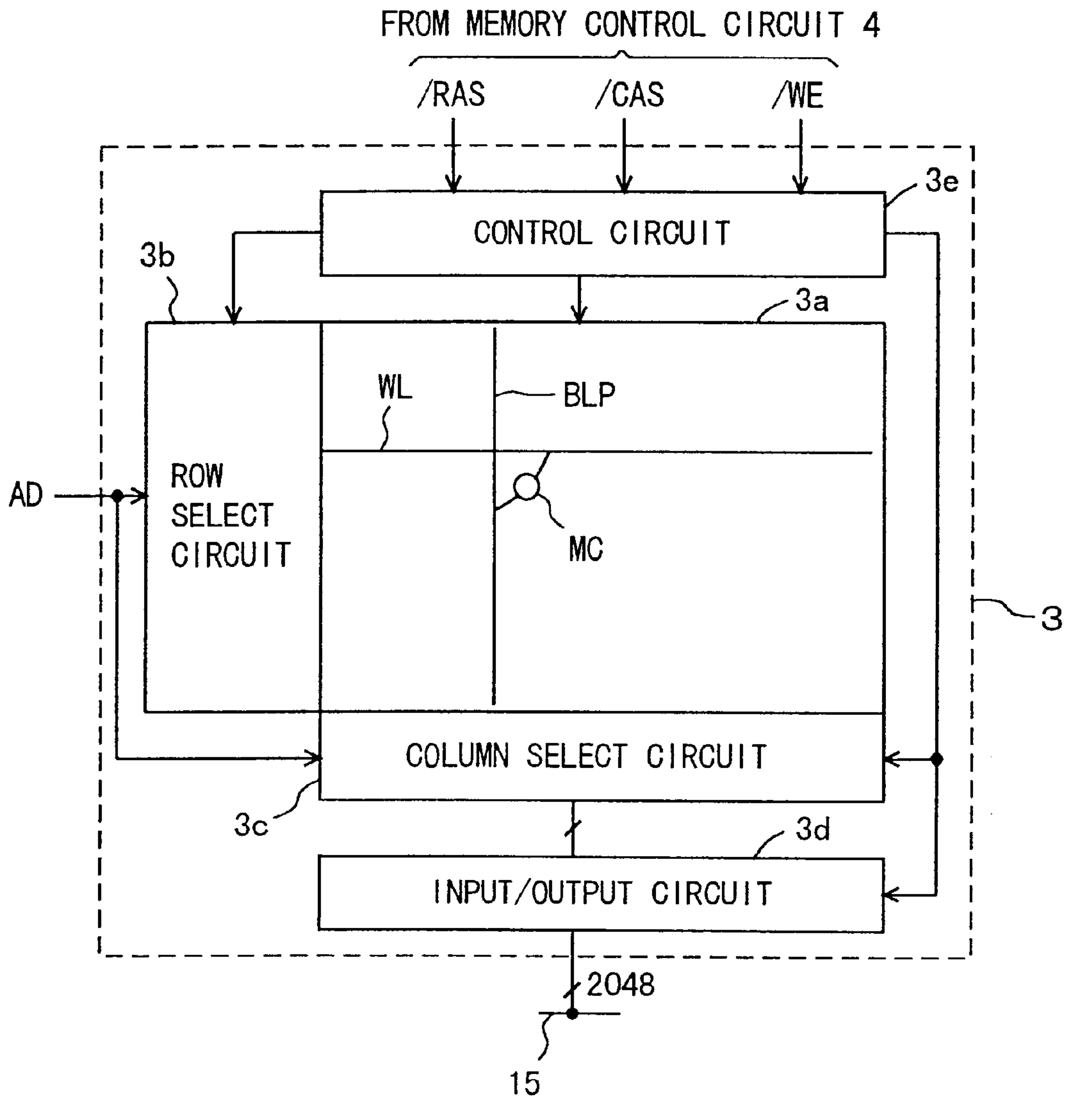
FIG. 12 is a diagram schematically showing a configuration of a rendering memory.

FIG. 12 schematically shows a configuration of rendering memory 3. Referring to FIG. 12, rendering memory 3 includes: a memory array 3*a* having a plurality of memory cells MC arranged in rows and columns, word lines WL provided corresponding to respective rows of memory cells MC and each having memory cells MC of corresponding row connected thereto, and a plurality of bit line pairs BLP arranged corresponding to respective columns of memory cells MC and each having memory cells MC of corresponding column connected thereto; a row select circuit 3*b* for driving a word line corresponding to an addressed row of memory array 3*a* to a selected state according to an address signal AD; a column select circuit 3*c* for selecting a bit line pair BLP corresponding to an addressed column of memory array 3*a* according to an address signal AD; an input/output circuit 3*d* for transferring data of 2048 bits between columns selected by column select circuit 3*c* and internal data bus 15; and a control circuit 3*e* for controlling row and column selecting operations in response to control signals /RAS, /CAS and /WE. Control circuit 3*e* also controls operations of a sense amplifier circuit for performing sensing and amplification of memory cell data and a precharge circuit for precharging bit line pairs, included in memory array 3*a*.

Rendering memory 3, formed of a standard DRAM, starts the row selecting operation internally when the row address strobe signal /RAS is activated to an L level, and starts the column selecting operation when the column address strobe signal /CAS is activated. When both the column address strobe signal /CAS and the write enable signal /WE are activated to the L level, rendering memory 3 performs data writing into addressed memory cells. When write enable signal /WE is in an inactive state at an H level, rendering memory 3 performs data reading of addressed memory cells.

Figure 13:
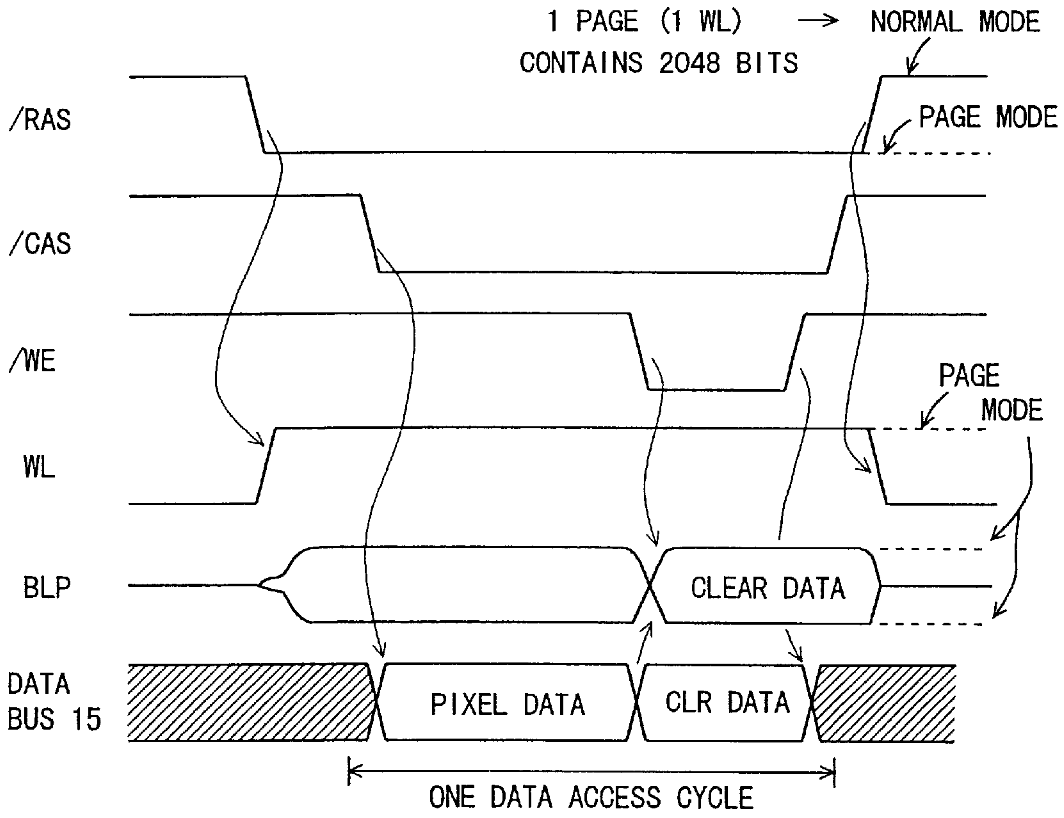
FIG. 13 is a signal waveform diagram illustrating a data accessing operation to a rendering memory 3 according to the third embodiment.

Now, the operation of rendering memory 3 shown in FIG. 12 will be described with reference to a signal waveform diagram of FIG. 13. In reading data from rendering memory 3, row address strobe signal /RAS is first activated. In response, row select circuit 3*b* is activated, and drives, according to address signal AD supplied at this time, word line WL corresponding to an addressed row in memory array 3*a* to a selected state. With word line WL driven to the selected state, data of memory cells MC connected to the selected word line WL are read out to corresponding bit line pairs BLP. Normally, a bit line pair has bit lines BL and /BL, with the memory cell data read out to one bit line, and with a reference potential for the memory cell data provided by the other bit line. Then, the sense amplifier circuit (not shown) performs sensing, amplification and latching of the data of bit line pair BLP.

When column address strobe signal /CAS is activated, column select circuit 3*c* selects an addressed column of memory array 3*a* according to address signal AD. When write enable signal /WE designates a data reading mode, the data of 2048 bits selected by column select circuit 3*c* are read in parallel onto internal data bus 15 under the control of control circuit 3*e*. When the pixel data of 2048 bits (64 pixels) are read onto internal data bus 15 and transmitted to the data transfer circuit, clear data are transmitted from memory control circuit 4 to internal data bus 15, and write enable signal /WE is set to an L level for designation of data writing. In response, input/output circuit 3*d* enters a data writing mode, and transmits the clear data supplied onto internal data bus 15 to memory cells MC on the column selected by column select circuit 3*c*. Thus, the data of memory cells having their data accessed are replaced by the clear data.

This mode of writing data to selected memory cells after data reading is normally called a read-modify-write mode. When the data writing is completed, column address strobe signal /CAS is inactivated to complete the column selecting operation. Then, row address strobe signal /RAS is driven to an H level of an inactive state, and in response, row select circuit 3*b* is inactivated under the control of control circuit 3*e*, and selected word line WL attains an unselected state. If data of 2048 bits are read out by one access to memory cells and the word line is driven to a selected/unselected state at every access cycle, a normal mode is performed (with a row including 2048 bits).

In a page mode, row address strobe signal /RAS maintains its active state, and only the column address signal is changed, so that data on another column connected to selected word line WL are accessed (with a row including 2048 by j bits j being an integer).

Rendering operation circuit 2 starts to generate pixel data for a next frame after transferring the pixel data for one frame stored in rendering memory 3 to display memory 5. Before starting the generation of the pixel data for the next frame, the data stored in rendering memory 3 are initialized, in order to prevent the pixel data of the previous frame from adversely affecting the pixel data for the next frame. With one access to rendering memory 3, data of 64 pixels consisting of 2048 bits are read onto internal data bus 15, the operation for reading out the pixel data of 64 pixels is repeated several times, and the pixel data for one frame are transferred via the data transfer circuit to display memory 5. The pixel data of 64 pixels having been read out are cleared upon each reading of 64 pixel data. Therefore, at the completion of pixel data transfer to display memory 5, the contents stored in rendering memory 3 are all replaced by clear data. Thus, immediately after the completion of its data transferring processing to the display memory, rendering operation circuit 2 is able to start the rendering processing for generating the pixel data for the next frame, enabling high speed rendering processing. The access to rendering memory 3 is controlled by memory control circuit 4.

Rendering memory 3 shown in FIG. 12 is formed of a standard DRAM. However, it may be formed of a clock synchronous memory (SDRAM) in which data input/output are performed in synchronization with a clock signal. When an SDRAM is used as rendering memory 3, an active command for driving a word line to a selected state is supplied, which is followed by application of a read command designating data reading. Then, a write command designating data writing is supplied, and after the writing of clear data into memory cells, a precharge command is supplied to drive the selected word line to an unselected state. Recently, in particular, a memory of a clock synchronous type having a wide internal data bus width, called an embedded DRAM (eRAM), has been widely used. By utilizing such an eRAM as rendering memory 3, high-speed data transfer can be realized (as the data transfer is performed in synchronization with the clock).

Sixth Embodiment

Figure 14:
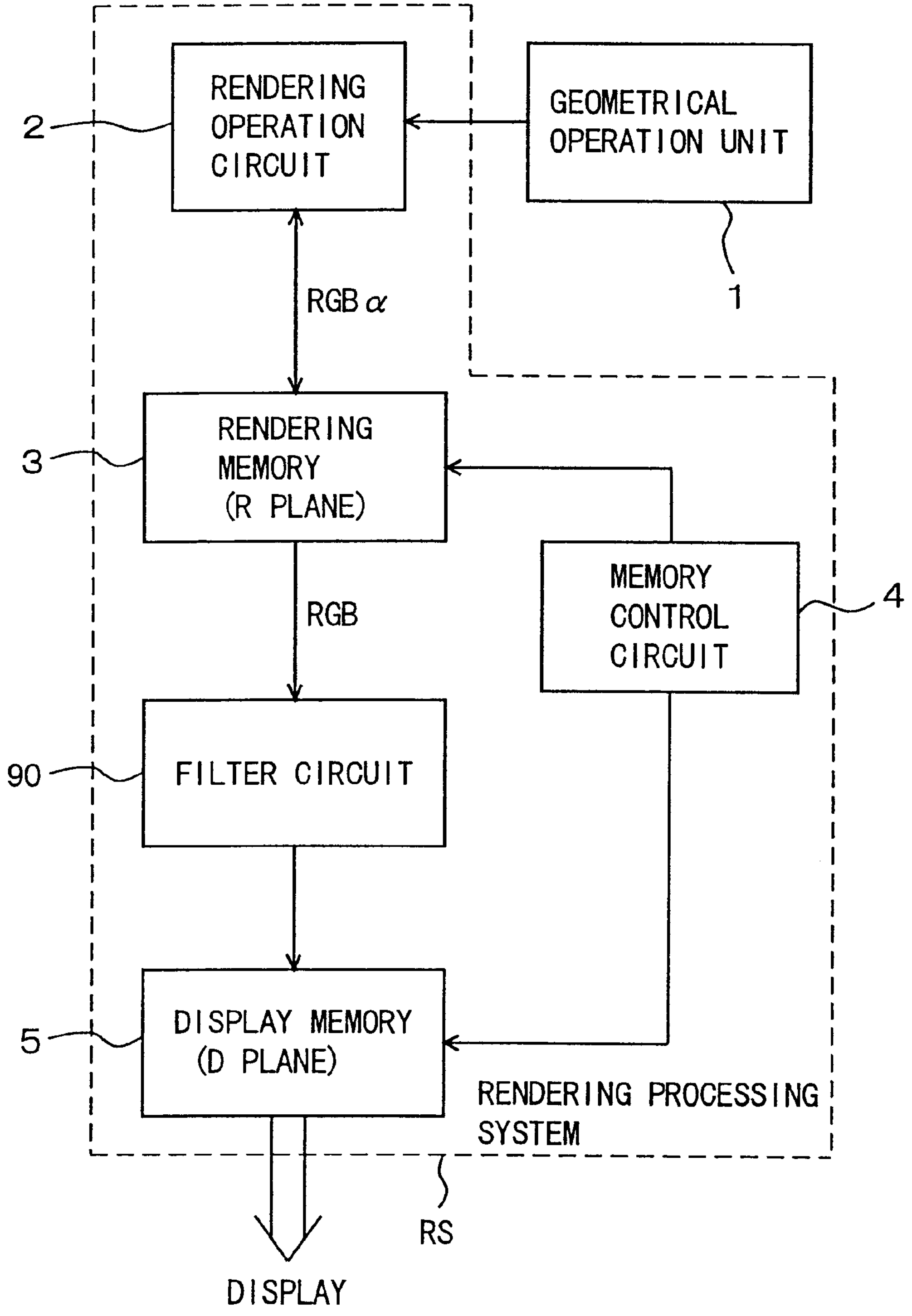
FIG. 14 is a diagram schematically showing a configuration of a rendering processing system according to a sixth embodiment of the present invention.

FIG. 14 schematically shows a configuration of the rendering processing system according to the sixth embodiment of the present invention. In the configuration shown in FIG. 14, a filter circuit 90 is provided between rendering memory 3 and display memory 5. Other configurations are identical to those shown in FIG. 1. From rendering memory 3, color information (R, G and B values) is supplied to filter circuit 90. Filter circuit 90 has, for example, a bi-linear filter function, and converts the pixel density in one frame by applying a pixel density conversion process, such as subsampling and interpolation, to pixel data for one frame output from rendering memory 3.

Figure 15:
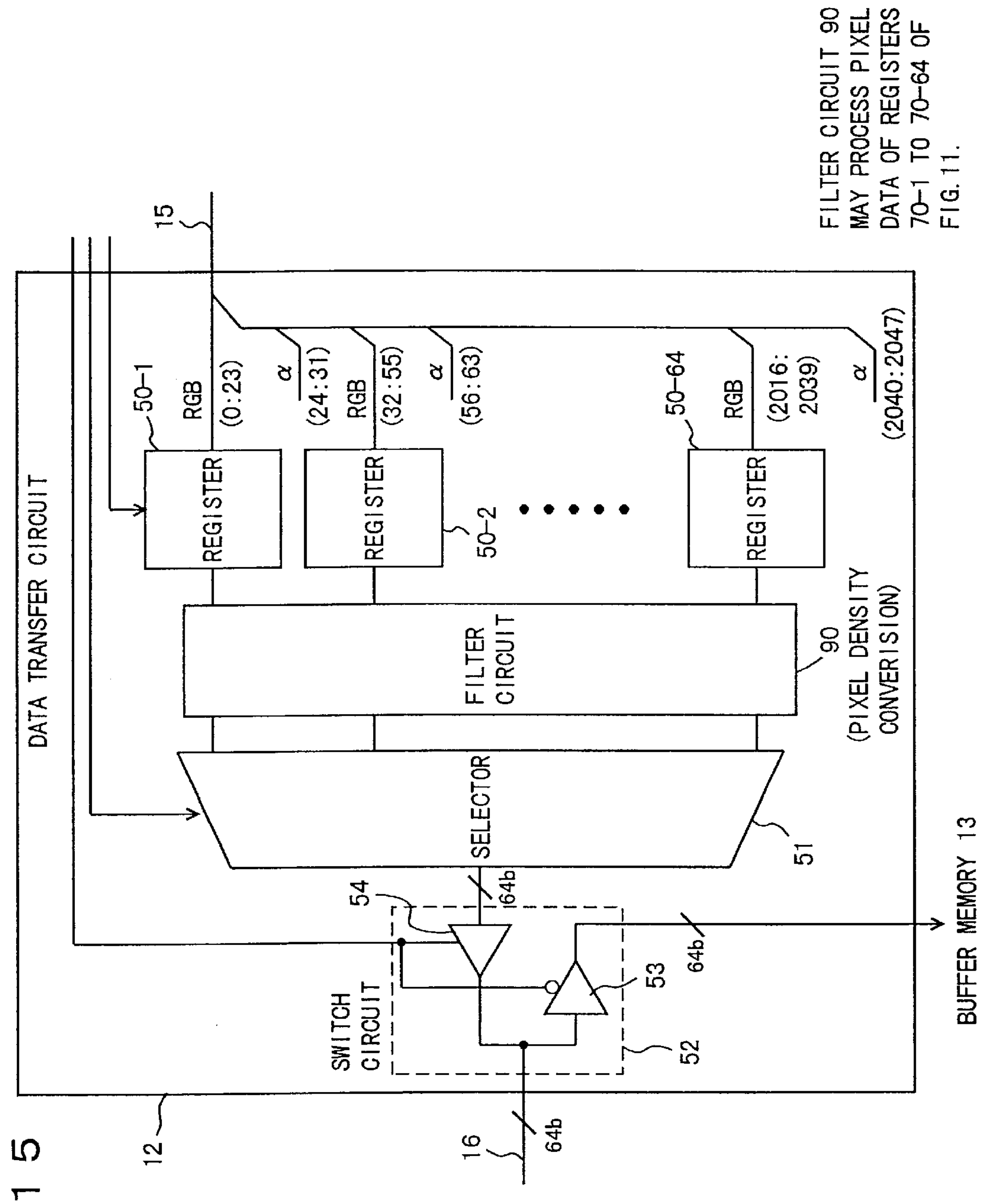
FIG. 15 is a diagram showing in more detail the arrangement of a filter circuit shown in FIG. 14.

FIG. 15 illustrates the arrangement of filter circuit 90 of FIG. 14 in more detail. Filter circuit 90 is provided within data transfer circuit 12 shown in FIG. 5. Data transfer circuit 12 includes registers 50-1 to 50-64 provided corresponding to 64 pieces of pixel data transferred in parallel on internal data bus 15. Registers 50-1 to 50-64 each store only the color information excluding the α value. Filter circuit 90 is coupled to registers 50-1 to 50-64 in parallel, receives the data (color information), and performs the filter processing operations, such as subsampling and interpolation, for conversion of the pixel density of one frame.

The output of filter circuit 90 is divided by selector 51 into transfer data units of 64 bits each for transference via selector 51 and switch circuit 52 to display memory 5. The selection manner of selector 51 varies dependent on the configuration of the pixel data output from filter circuit 90. In the case of the subsampling operation, filter circuit 90 removes a prescribed number of pixel data from the 64 pixels supplied in parallel from registers 50-1 to 50-64, and samples the pixel data for every prescribed number of pieces of data for application to selector 51. If the interpolation operation is performed, filter circuit 90 has a buffer circuit therein, and performs the interpolation operation using a plurality of pixels adjacent to one another in a two-dimensional plane for creation of new pixel data. In this case, selector 51 sequentially selects pixel data from an upper bit location to generate transfer data of 64 bits each, too. Thus, it is possible to perform high-speed conversion between two different pixel display standards including VGA (video graphics array), SVGA (super video graphics array), XGA (extended graphics array) and NTSC (national television system committee), each standard having a different pixel density. Further, by the bi-linear filter function of the filter circuit, a high-quality image can be obtained. The bi-linear filter function, also called a bi-linear interpolation function, is a function of generating an intermediate image from two, large and small images. By this bi-linear filter function, it is possible to obtain a higher quality image compared to a simple magnification/reduction processing. By providing filter circuit 90 with the bi-linear interpolation function, it is possible to alleviate the distortion of an image due to subsampling by applying this function to the subsampled pixel data.

In the configurations as shown in FIGS. 14 and 15, display memory 5 may be a dual port RAM. Further, filter circuit 90 may be configured to receive the R, G and B values reducing bit number to perform the filter operation process.

As described above, according to the present invention, a first memory stores a plurality of pixel data corresponding to a plurality of pixels constituting one screen, each pixel data including color information representing red, green and blue of a pixel and α value information representing transparency of the pixel. Of the plurality of pixel data stored in the first memory, data corresponding to the data excluding of at least α value information of each pixel data are transferred to and stored in a second memory. Thus, the storage capacity of the second memory, and hence, the storage capacity of the first and second memories as a whole can be reduced. Further, the number of data transfer is reduced, and correspondingly, the data transfer time is reduced, which enables high speed processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rendering processing system, comprising:

rendering operation circuitry for performing an operation for generating a plurality of pixel data corresponding to a plurality of pixels constituting a screen;

a first memory receiving and storing the plurality of pixel data output from said rendering operation circuitry, each of said plurality of pixel data including three-color information of red, blue and green of a corresponding pixel and α value information representing transparency of said corresponding pixel;

a second memory for storing supplied pixel data and for outputting stored pixel data to a display unit for display of an image;

a transfer circuit removing prescribed data from each of the pixel data stored in said first memory, and generating transfer pixel data corresponding to the pixel data for transference and storage to said second memory, said prescribed data including at least said $\alpha$ value information; and a memory control circuit for controlling operations of the first and second memories, wherein said memory control circuit includes means for performing output of the data from said second memory to said display unit and writing of the pixel data from said first memory to said second memory in an interleaved manner.

2. The rendering process system according to claim 1, wherein said memory control circuit includes means for completing writing of the pixel data for a next screen to said second memory within a V blank representing a vertical blank period of the screen of said display unit upon data transfer from said second memory to said display unit.

3. A rendering processing apparatus comprising:

rendering operation circuitry performing an operation for generating a plurality of pixel data corresponding to a plurality of pixels constituting a screen, each pixel data including three-color information of red, green and blue, and alpha value information representing transparency of the corresponding pixel;

a first memory for storing said plurality of pixel data output from said rendering operation circuitry;

a transfer circuit connected to said first memory, for obtaining transfer data from said plurality of pixel data excluding prescribed data, and transferring the transfer data to a second memory, said prescribed data including at least the alpha value information from each of said plurality of pixel data;

a first bus connected to said rendering operation circuitry and said first memory and transmitting said plurality of pixel data, said rendering operation circuitry receiving data from said first memory through said first bus and performing the operation using the received data, and a second bus connected to said transfer circuit and said second memory and transmitting the transfer data, said second bus having a bus width less than that of said first bus.

4. The rendering apparatus according to claim 3, wherein said transfer circuit includes;

a third bus having a bus width larger than that of said second bus, and a selector having an input connected to said third bus and an output connected to said second bus, said selector selecting a part of bits constituting said third bus and connecting the selected part of bits to said second bus.

5. A rendering processing apparatus comprising:

rendering operation circuitry performing an operation for generating a plurality of pixel data corresponding to a plurality of pixels constituting a screen, each pixel data including three-color information of red, green and blue, and alpha value information representing transparency of the corresponding pixel;

a first memory for storing said plurality of pixel data output from said rendering operation circuitry;

a transfer circuit connected to said first memory, for obtaining transfer data from said plurality of pixel data excluding prescribed data, and transferring the transfer data to a second memory, said prescribed data including at least the alpha value information from each of said plurality of pixel data;

a bus transmitting the transfer data to said second memory; and a buffer memory storing data transmitted on said bus and outputting the data to a display unit for displaying an image, wherein said transfer circuit includes a switch circuit for selectively forming a first signal path for applying the transfer data to said bus and a second signal path for applying the data transmitted on said bus to said buffer memory.

6. The rendering processing apparatus according to claim 5, further comprising a control circuit controlling said switch circuit such that a transfer operation of data with respect to one image through said second signal path and a transfer operation of data with respect to next one image through said first signal path are performed alternately.

7. A method of rendering an image, comprising the steps of:

generating a plurality of first pixel data corresponding to a plurality of pixels constituting a screen, each first pixel data including three-color information of red, green and blue, and alpha value information representing transparency of the corresponding pixel;

storing the plurality of first pixel data in a first memory;

transferring first transfer data to a second memory through a data bus, the first transfer data being obtained from the plurality of first pixel data excluding at least the alpha value information of each first pixel data;

storing the first transfer data in said second memory;

transferring the first transfer data from said second memory to a display unit for displaying an image;

generating a plurality of second pixel data corresponding to a plurality of pixels constituting anther screen, each second pixel data including three-color information of red, green and blue, and alpha value information representing transparency of the corresponding pixel;

storing the plurality of second pixel data in said first memory; and transferring second transfer data to said second memory through the data bus, said second transfer data being obtained from the plurality of second pixel data excluding at least the alpha value information of each of second pixel data, wherein an operation of transferring the second transfer data and an operation of transferring the first transfer data are performed alternately on the data bus.

* * * * *

UNITED STATES PATENT AND TRADEMARK OFFICE
CERTIFICATE OF CORRECTION

PATENT NO. : 6,753,872 B2 — Page 1 of 1
DATED : June 22, 2004
INVENTOR(S) : Shohei Moriwaki et al.

It is certified that error appears in the above-identified patent and that said Letters Patent is hereby corrected as shown below:

Title page,
Item [73], Assignee, add -- Mitsubishi Electric System LSI Design Corporation, Hyogo (JP) --

Signed and Sealed this

Twenty-second Day of March, 2005

JON W. DUDAS
*Director of the United States Patent and Trademark Office*